US008806358B2

(12) United States Patent
Mayer et al.

(10) Patent No.: US 8,806,358 B2
(45) Date of Patent: Aug. 12, 2014

(54) POSITIVE IDENTIFICATION AND BULK ADDITION OF CUSTODIANS TO A CASE WITHIN AN ELECTRONIC DISCOVERY SYSTEM

(75) Inventors: Michael J. Mayer, Charlotte, NC (US); Emerson D. Miller, Charlotte, NC (US); David M. Andersen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 469 days.

(21) Appl. No.: 12/730,799

(22) Filed: Mar. 24, 2010

(65) Prior Publication Data

US 2010/0251149 A1 Sep. 30, 2010

Related U.S. Application Data

(60) Provisional application No. 61/164,276, filed on Mar. 27, 2009.

(51) Int. Cl.
*G06F 17/30* (2006.01)
*G06F 3/048* (2013.01)
*H04L 29/06* (2006.01)

(52) U.S. Cl.
CPC .......... *G06F 17/30011* (2013.01); *H04L 63/30* (2013.01)
USPC .................... 715/764; 707/758; 707/E17.014

(58) Field of Classification Search
CPC ................................ H04L 63/30; G06F 17/30
USPC .......................................................... 715/764
See application file for complete search history.

(56) References Cited

U.S. PATENT DOCUMENTS 6,119,137 A  9/2000 Smith et al.
6,601,108 B1  7/2003 Marmor (Continued)

FOREIGN PATENT DOCUMENTS

EP  1093068 A2  4/2001
EP  1349089 A2  1/2003

(Continued)

OTHER PUBLICATIONS

"Finding Communities of Practice from User Profiles Based on Folksonomies" (hereinafter Folksonomies) by J'org Diederich and Tereza Iofciu published Jan 7, 2007 at http://web.archive.org/web/20070107062816/http://www.13s.de/~diederich/Papers/TBProfile-telcops.pdf.*

(Continued)

*Primary Examiner* — Weilun Lo
*Assistant Examiner* — Peiyong Weng
(74) *Attorney, Agent, or Firm* — Michael A. Springs; Moore & Van Allen PLLC; James C. Edwards

(57) ABSTRACT

Embodiments of the invention relate to systems, methods, and computer program products for improved electronic discovery. More specifically, embodiments relate to providing positive identification of individuals for addition, as custodians, to cases or matters within an electronic discovery system. The identification is performed simultaneously, in bulk, using disparate information related to the individuals. In this regard, individuals can be positively identified through one specific identification procedure, without having to search multiple databases to verify the identity of an individual/custodian. In addition to positively identifying custodians, the present invention provides for adding the identified custodians, simultaneously, in bulk, to a case or matter and, in some embodiments, uploading or otherwise transferring custodian profile data to the case management system/database, as need be.

23 Claims, 11 Drawing Sheets

(56) References Cited

U.S. PATENT DOCUMENTS

| | | |
|---|---|---|
| 6,658,625 B1 | 12/2003 | Allen |
| 6,941,361 B1 | 9/2005 | Fink et al. |
| 7,076,543 B1 | 7/2006 | Kirti et al. |
| 7,124,249 B1 | 10/2006 | Darcy |
| 7,134,020 B2 | 11/2006 | Eagle et al. |
| 7,376,969 B1 | 5/2008 | Njemanze et al. |
| 7,451,103 B1 | 11/2008 | Boyle et al. |
| 7,451,139 B2 | 11/2008 | Namba |
| 7,765,181 B2 | 7/2010 | Thomas et al. |
| 7,895,229 B1* | 2/2011 | Paknad .................. 707/769 |
| 8,073,729 B2 | 12/2011 | Kisin et al. |
| 2002/0194097 A1 | 12/2002 | Reitz |
| 2002/0198629 A1 | 12/2002 | Ellis |
| 2003/0154199 A1 | 8/2003 | Thomas et al. |
| 2003/0182375 A1 | 9/2003 | Zhu et al. |
| 2003/0200308 A1 | 10/2003 | Tameda et al. |
| 2004/0098424 A1 | 5/2004 | Seidenberg et al. |
| 2004/0260733 A1 | 12/2004 | Adelstein et al. |
| 2005/0086720 A1 | 4/2005 | Shimizu et al. |
| 2005/0108435 A1* | 5/2005 | Nowacki et al. ............ 709/246 |
| 2005/0152235 A1 | 7/2005 | Hoshizawa |
| 2005/0177527 A1 | 8/2005 | Morris et al. |
| 2006/0095795 A1 | 5/2006 | Nakamura et al. |
| 2006/0167877 A1 | 7/2006 | Lee et al. |
| 2006/0256739 A1 | 11/2006 | Seier et al. |
| 2007/0027974 A1 | 2/2007 | Lee et al. |
| 2007/0073894 A1 | 3/2007 | Erickson et al. |
| 2007/0088754 A1 | 4/2007 | Brannon et al. |
| 2007/0112783 A1 | 5/2007 | McCreight et al. |
| 2007/0162547 A1 | 7/2007 | Ross |
| 2007/0208918 A1 | 9/2007 | Harbin et al. |
| 2007/0226170 A1 | 9/2007 | Sun |
| 2007/0271517 A1 | 11/2007 | Finkelman et al. |
| 2007/0288579 A1 | 12/2007 | Schunemann |
| 2008/0027895 A1 | 1/2008 | Combaz |
| 2008/0046260 A1 | 2/2008 | Ghielmetti et al. |
| 2008/0061146 A1 | 3/2008 | Komaki |
| 2008/0082672 A1 | 4/2008 | Garrett |
| 2008/0168145 A1 | 7/2008 | Wilson |
| 2008/0252936 A1 | 10/2008 | Stratton |
| 2008/0288479 A1 | 11/2008 | Paknad et al. |
| 2008/0294492 A1 | 11/2008 | Simpson et al. |
| 2009/0001162 A1 | 1/2009 | Asher et al. |
| 2009/0006973 A1 | 1/2009 | Newell et al. |
| 2009/0043819 A1 | 2/2009 | Searl et al. |
| 2009/0132262 A1 | 5/2009 | Paknad |
| 2009/0164522 A1 | 6/2009 | Fahey |
| 2009/0165026 A1 | 6/2009 | Paknad et al. |
| 2009/0183253 A1 | 7/2009 | Kates |
| 2009/0286219 A1 | 11/2009 | Kisin et al. |
| 2010/0017239 A1 | 1/2010 | Saltzman et al. |
| 2010/0033750 A1 | 2/2010 | Tischler et al. |
| 2010/0082382 A1 | 4/2010 | Kisin et al. |
| 2010/0082555 A1 | 4/2010 | Ogawa et al. |
| 2010/0205020 A1 | 8/2010 | Losey |
| 2010/0223108 A1 | 9/2010 | Quinn, Jr. |
| 2011/0040600 A1 | 2/2011 | Paknad et al. |
| 2011/0173033 A1 | 7/2011 | Paknad et al. |

FOREIGN PATENT DOCUMENTS

| | | |
|---|---|---|
| WO | 01/27765 A1 | 4/2001 |
| WO | 0210967 A2 | 2/2002 |
| WO | 02071192 A2 | 9/2002 |
| WO | 03/065256 A1 | 8/2003 |
| WO | 2004092902 A2 | 10/2004 |
| WO | 2006001833 A2 | 1/2006 |
| WO | 2006031836 A2 | 3/2006 |
| WO | WO 2006/031836 A2 | 3/2006 |
| WO | 2006052441 A2 | 5/2006 |
| WO | 2007/044709 | 4/2007 |
| WO | 2007076515 A2 | 7/2007 |
| WO | WO 2007/076515 | 7/2007 |
| WO | 2008009991 A1 | 1/2008 |
| WO | 2008070415 A2 | 6/2008 |
| WO | WO 2008/070415 A2 | 6/2008 |

OTHER PUBLICATIONS

Ciravegna et al.: "User-System Cooperation in Document Annotation based on Information Extraction" 2002. Proceedings of the 13th International Conference on Knowledge Engineering and Knowledge Management.

Buchholz et al.: "On the Role of File System Metadata in Digital Forensics", Journal of Digital Investigation, vol. 1(4), pp. 297-308, Dec. 1, 2004.

Golden et al. Scalpel: "A Frugal, High Performance File Carver" 2005 Digital Forensic Research Workshop (DFRWS) New Orleans, LA.

Manson et al.: "Is the Open Way a Better Way? Digital Forensics using Open Source Tools". System Sciences, 2007. HICSS 2007. 40th Annual Hawaii International Conference on, IEEE, PI, Jan. 1, 2007. ISBN:978-0-7695-2755-0.

Berinato: "The Rise of Anti-Forensics" http/www.csoonline.comiarticle/print/221208. Jun. 8, 2007.

Anonymous: "EDRM LegalTech 2009 Luncheon Presentation" E.D. R.M. The Electronic Discovery Reference Model Feb. 9, 2009. Retrieved from the Internet: http://www.edrm.net/wp-content/plugins/download-monitor/download.php?id=6.

Singapore Patent Application No. 201002126-9 Search Report and Written Opinion mailed Aug. 3, 2011.

Singapore Patent Application No. 201002129-3 Search Report and Written Opinion mailed Aug. 3, 2011.

Singapore Patent Application No. 201002128-5 Search Report and Written Opinion mailed Aug. 3, 2011.

Singapore Patent Application No. 201002139-2 Search Report and Written Opinion mailed Aug. 3, 2011.

Singapore Patent Application No. 201002137-6 Search Report and Written Opinion mailed Aug. 15, 2011.

Singapore Patent Application No. 201002138-4 Search Report and Written Opinion mailed Aug. 19, 2011.

Singapore Patent Application No. 201002125-1 Search Report and Written Opinion mailed Aug. 24, 2011.

Singapore Patent Application No. 201002134-3 Search Report and Written Opinion mailed Aug. 25, 2011.

Singapore Patent Application No. 201002124-4 Search Report and Written Opinion mailed Aug. 25, 2011.

J. Barlow, L. Bean and D.D. HOTT: "Employee 'Spy' Software: Should You Use It?" The Journal of Corporate Accounting & Finance, Document No. XP-002601405, pp. 7-12; Retrieved from the Internet: URL: http://onlinelibrary.wiley.com/10.1002/icaf.10162/abstract[retrieved on Sep. 17, 2010].

Dan Manson et al.: "Is the Open Way a Better Way? Digital Forensics using Open Source Tools", Proceedings of the $40^{th}$ Hawaii International Conference on System Sciences-2007 [dated Jan. 1, 2007]; 10 pages total.

Anonymous: "EDRM LegalTech 2009 Luncheon Presentation", E.D.R.M.—The Electronic Discovery Reference Model; Document No. XP-002601404 LegalTech Lunch & Learn, Feb. 3, 2009, LegalTech New York; Retrieved from the Internet: URL:http//edrm.net/002/wp-content/uploads/2009/09/EDRM_LegalTech.pdf[retrieved Sep. 17, 2010].

Extended European Search Report dated Sep. 23, 2010 for European Application No. EP 10 25 0580.

U.S. Appl. No. 12/534,375, filed Aug. 3, 2009.
U.S. Appl. No. 12/614,059, filed Nov. 6, 2009.
U.S. Appl. No. 12/618,430, filed Nov. 13, 2009.
U.S. Appl. No. 12/618,443, filed Nov. 13, 2009.
U.S. Appl. No. 12/627,791, filed Nov. 30, 2009.
U.S. Appl. No. 12/627,890, filed Nov. 30, 2009.
U.S. Appl. No. 12/627,996, filed Nov. 30, 2009.
U.S. Appl. No. 12/696,653, filed Jan. 29, 2010.
U.S. Appl. No. 12/702,641, filed Feb. 9, 2010.
U.S. Appl. No. 12/729,987, filed Mar. 23, 2010.
U.S. Appl. No. 12/730,780, filed Mar. 24, 2010.
U.S. Appl. No. 12/730,785, filed Mar. 24, 2010.

(56) References Cited

OTHER PUBLICATIONS

U.S. Appl. No. 12/730,790, filed Mar. 24, 2010.
U.S. Appl. No. 12/730,792, filed Mar. 24, 2010.
U.S. Appl. No. 12/730,807, filed Mar. 24, 2010.
U.S. Appl. No. 12/730,818, filed Mar. 24, 2010.
U.S. Appl. No. 12/730,821, filed Mar. 24, 2010.
U.S. Appl. No. 12/730,840, filed Mar. 24, 2010.
U.S. Appl. No. 12/730,848, filed Mar. 24, 2010.
U.S. Appl. No. 12/730,851, filed Mar. 24, 2010.
U.S. Appl. No. 12/731,657, filed Mar. 25, 2010.
Singapore Patent Application No. 201002142-6 Search Report and Written Opinion mailed Sep. 5, 2011.
Singapore Patent Application No. 201002144-2 Search Report and Written Opinion mailed Sep. 5, 2011.
Singapore Patent Application No. 201002140-0 Search Report and Written Opinion mailed Sep. 27, 2011.
SysTools Software, "Export Notes—Notes Email Migration Tool", 2008, available online: http://web.archive.org/web/20080201104418/http://www.exportlotusnotes.com/export-notes.
Process Text Group, "ABC Amber BlackBerry Converter", 2008, available online: http:web.archive.org/web/20080302025411/http://www.processtext.com/abcblackberry.html.
Search Report and Written Opinion for Singapore Application No. 201002122-8 mailed Jan. 3, 2012.
Search Report and Written Opinion for Singapore Application No. 201002141-8 mailed Jan. 3, 2012.
Search Report and Written Opinion for Singapore Application No. 201002143-4 mailed Jan. 3, 2012.
Search Report and Written Opinion for Singapore Application No. 201002120-2 mailed Feb. 10, 2012.
Second Written Opinion for Singapore Application No. 201002126-9 mailed Mar. 14, 2012.
Second Written Opinion for Singapore Application No. 201002128-5 mailed Mar. 14, 2012.
Second Written Opinion for Singapore Application No. 201002129-3 mailed Mar. 14, 2012.
Second Written Opinion for Singapore Application No. 201002139-2 mailed Mar. 14, 2012.
Danish Patent and Trademark Office. Singapore Examination Report mailed Mar. 15, 2012. Applicant: Bank of America Corporation. Singapore Patent Application No. 201002134-3. DKPTO SE No. SE 2012 00392v. English Language. 10 pages. Date of Examination Report: Mar. 12, 2012.
Danish Patent and Trademark Office. Singapore Examination Report mailed Mar. 15, 2012. Applicant: Bank of America Corporation. Singapore Patent Application No. 201002124-4. DKPTO SE No. SE 2012 00392y. English Language. 10 pages. Date of Examination Report: Mar. 12, 2012.
Examination Report for European Application No. 10250588.0 dated Jun. 27, 2012.
Second Written Opinion for Singapore Application No. 201002120-2 dated Jul. 20, 2012.
Second Written Opinion for Singapore Application No. 201002141-8 dated Jul. 20, 2012.
Second Written Opinion for Singapore Application No. 201002140-0 dated Aug. 6, 2012.
Second Written Opinion for Singapore Application No. 201002144-2 dated Aug. 6, 2012.
European Patent Office. European Office Action dated Apr. 25, 2012. European Application No. 10 250 578.1. Name of Applicant: Bank of America Corporation. English Language. 10 pages.
European Patent Office. European Office Action dated Apr. 25, 2012. European Application No. 10 250 591.4. Name of Applicant: Bank of America Corporation. English Language. 10 pages.
European Patent Office. European Office Action dated Apr. 26, 2012. European Application No. 10 250 585.6. Name of Applicant: Bank of America Corporation. English Language. 10 pages.
European Patent Office. European Office Action dated Apr. 26, 2012. European Application No. 10 250 589.8. Name of Applicant: Bank of America Corporation. English Language. 10 pages.
European Patent Office. European Office Action dated Apr. 26, 2012. European Application No. 10 250 579.9. Name of Applicant: Bank of America Corporation. English Language. 10 pages.
European Patent Office. European Office Action dated Apr. 26, 2012. European Application No. 10 250 584.9. Name of Applicant: Bank of America Corporation. English Language. 10 pages.
European Patent Office. European Office Action dated Apr. 25, 2012. European Application No. 10 250 586.4. Name of Applicant: Bank of America Corporation. English Language. 10 pages.
European Patent Office. European Office Action dated Apr. 25, 2012. European Application No. 10 250 581.5. Name of Applicant: Bank of America Corporation. English Language. 10 pages.
European Patent Office. European Office Action dated Apr. 25, 2012. European Application No. 10 250 576.5. Name of Applicant: Bank of America Corporation. English Language. 11 pages.
European Patent Office. European Office Action dated Apr. 27, 2012. European Application No. 10 250 587.2. Name of Applicant: Bank of America Corporation. English Language. 10 pages.
European Patent Office. European Office Action dated Apr. 25, 2012. European Application No. 10 250 577.3. Name of Applicant: Bank of America Corporation. English Language. 10 pages.
European Patent Office. European Office Action dated Apr. 25, 2012. European Application No. 10 250 580.7. Name of Applicant: Bank of America Corporation. English Language. 10 pages.
European Patent Office. European Office Action dated Apr. 25, 2012. European Application No. 10 250 590.6. Name of Applicant: Bank of America Corporation. English Language. 10 pages.
European Patent Office. European Office Action dated Apr. 26, 2012. European Application No. 10 250 582.3. Name of Applicant: Bank of America Corporation. English Language. 10 pages.
Great Britain Intellectual Property Office. GB Examination Report dated Apr. 23, 2012. Great Britain Application No. GB1108090.0. Name of Applicant: Bank of America Corporation. English Language. 3 pages.
Hewlett Packard. "*HP OpenView Storage Data Protector Concepts Guide*." Release A.06.00. Manufacturing Part No. B6960-96001. English Language. Jul. 2006.
Hungarian Intellectual Property Office. Written Opinion mailed Apr. 5, 2012. Hungary Application No. 201002137-6. Name of Applicant: Bank of America Corporation. English Language. 8 pages. Date of Written Opinion: Mar. 21, 2012.
Hungarian Intellectual Property Office. Written Opinion mailed Apr. 5, 2012. Hungary Application No. 201002138-4. Name of Applicant: Bank of America Corporation. English Language. 8 pages. Date of Written Opinion: Mar. 29, 2012.
European Patent Office. European Office Action dated Apr. 26, 2012. European Application No. 10 250 583.1. Name of Applicant: Bank of America Corporation. English Language. 10 pages.

* cited by examiner

POSITIVE IDENTIFICATION AND BULK ADDITION OF CUSTODIANS TO A CASE WITHIN AN ELECTRONIC DISCOVERY SYSTEM

CLAIM OF PRIORITY UNDER 35 U.S.C. §119

The present application for patent claims priority to Provisional Application No. 61/164,276 entitled "Electronic Discovery System" filed Mar. 27, 2009, and assigned to the assignee hereof and hereby expressly incorporated by reference herein.

FIELD

In general, embodiments of the invention relate to methods, systems, apparatus and computer program products for electronic discovery and, more particularly, identifying and adding custodians in bulk to a case or matter within an electronic discovery system.

BACKGROUND

Electronic discovery, commonly referred to as e-discovery, refers to any process in which electronic data is sought, located, secured and searched with the intent of using it as evidence in a legal proceeding, an audit, a securities investigation, a forensics investigation or the like. E-discovery can be carried out offline on a particular computer or it can be accomplished in a network environment.

The nature of digital data makes it extremely well-suited for investigation. In particular, digital data can be electronically searched with ease, whereas paper documents must be scrutinized manually. Furthermore, digital data is difficult or impossible to completely destroy, particularly if the data is stored in a network environment. This is because the data appears on multiple hard drives, and because digital files, even if deleted, generally can be undeleted. In fact, the only reliable means of destroying digital data is to physically destroy any and all hard drives where it is stored.

In the process of electronic discovery, data of all types can serve as evidence. This can include text, image, calendar event data, databases, spreadsheets, audio files, multimedia files, web sites and computer programs. Electronic mail (i.e., e-mail) can be an especially valuable source of evidence in civil or criminal litigation, because people are often less careful in these exchanges than in hard copy correspondence such as written memos or postal letters.

E-discovery is an evolving field that goes far beyond mere technology. It gives rise to multiple issues, many of which have yet to be resolved. For example, identifying data required to satisfy a given discovery request, locating the appropriate set of data that has been identified, and retrieving the data once it has been identified and located all pose problems in and of themselves. This is especially evident if the data that is being identified, located and retrieved comes from an evolving or disparate enterprise, such as a corporation that has experienced mergers, acquisitions, downsizing and the like. Mergers and acquisitions mean that the technology infrastructure across the enterprise may vary, at least in the interim. However, e-discovery must be able locate and retrieve data from these disparate technology infrastructure in a timely fashion, sometimes within days of when the merger/acquisition occurs.

In addition to identifying, locating and retrieving digital data, the most critical part of any electronic discovery is the preservation of data, which involves maintaining an original source copy and storing it for preservation purposes or furthering processing. This too becomes a daunting task for the enterprise system that encompasses a myriad of different technology infrastructures and the like. Therefore, a need exists to improve the identification, location, retrieval and preservation processes, especially in instances in which the enterprise system includes disparate technology infrastructures and the like.

As previously noted, e-discovery, as opposed as conventional discovery of printed materials, provides for the ability to filter or search the data so as to reduce the volume of data to only that which is relevant to the request. Such searching is typically accomplished by determining a specific date range for the request, providing key words relevant to the case and the like. Improvements in the area of searching are greatly in need to further add efficiency to the overall e-discovery process.

Once data has been retrieved, preserved and, in some instances, searched the electronic data may be reviewed by the requesting entry, such as a law firm, securities commission or the like. While large requests are generally suited for online review, the manner in which the data is presented for review adds efficiency to the review process and ultimately drives the cost of the review process. Therefore, improvements in the manner in which data is presented for review are also desirable as a means of increasing efficiency and reducing costs.

Lastly, once the digital data has been reviewed, data identified as relevant may need to be produced in a tangible format for further analysis or legal evidentiary purposes. The produced documents must be properly identified and include necessary redactions and confidentiality markings.

Up until now, e-discovery management has been conducted on a case-by-case basis, meaning all tasking and workflow related to the e-discovery is based at the case level. Such management does not allow for finer granularity in the management of a case or for links to exist between different cases for the purpose of leveraging the e-discovery related to one case to another new or pre-existing case. Therefore, a need exists to improve the manner in which cases are managed and, in particular, how tasking and workflow are managed depending on case requirements and the like.

One specific problem associated with electronic discovery is the identification and timely addition of individuals, referred to herein as custodians, that need to added to a case or a matter. A custodian is an individual that possesses information, in particular electronic data, such as e-mails, documents and the like, relevant to an assigned case or matter and, therefore, collection of the data from the custodian is necessary. However, in many instance the electronic discovery associate is provided with a plethora of disparate information pertaining to individuals who may require addition, as custodians, to a case or matter. This information may include, but is not limited to, first names, last names, email addresses, telephone numbers, employee numbers and the like. If the e-discovery associate is not in possession with enough information to positively identify an individual as the individual that requires addition to the case or matter, the e-discovery associate is tasked with searching various databases or the like, either manually or electronically, to confirm the identity of an individual and to gather the requisite information needed to add the individual, as a custodian, to the case or matter. Such searching is a time-consuming endeavor that is exasperated when a multitude of individuals require addition to a case or matter Therefore, a need exists to be able to positively identify individuals for addition, as custodians, to cases or matters within an electronic discovery system. The desired solution should provided for performing the identification in bulk, such that a large number of individuals can be simultaneously identified without having to perform separate searches. In addition, once a plurality of individuals have been positively identified as the individuals that require addition, as custodians, to the case or matter, a need exists to add these individuals, in unison, to the case or matter, as a means of providing further efficiency to the overall case management process. Additionally, a need exists to define the added custodians as a group and to automatically perform certain e-discovery activities based on adding the group of custodians to the case.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for electronic discovery and, in particular, providing positive identification of individuals for addition, as custodians, to cases or matters within an electronic discovery system. The identification is performed simultaneously, in bulk, using disparate information related to the individuals. In this regard, individuals can be positively identified through one specific identification procedure, without having to search multiple databases to verify the identity of an individual/custodian. In addition to positively identifying custodians, the present invention provides for adding the identified custodians, simultaneously, in bulk, to a case or matter and, in some embodiments, uploading or otherwise transferring custodian profile data to the case management system/database, as need be. Additionally, embodiments of the present invention provide for configuring the system to perform automated e-discovery activities, such as communicating preservation notices, collecting data or the like, on the group of custodians based on their addition to the case.

A method for adding, in unison, a plurality of custodians to an electronic discovery case provides for specific embodiments of the invention. The method includes receiving, at a computing device, a plurality of identifying data items. Each of the plurality of identifying data items is associated with one of a plurality of individuals potentially requiring addition to a case within the electronic discovery system. The identifying data items may include, but are not limited to, a first name, a last name, an electronic mail (e-mail) address, an employee number, a first name, a last name, an operating system account number or the like. The method further includes accessing, via a computing device processor, a database, such as a Unified Directory or the like, within the electronic discovery system. The database stores data associated with the custodians in the electronic discovery system. Further, the method includes determining, via a computing device processor, matches between the plurality of identifying data items and the data associated with the custodians and presenting, at a computing devices, for each of the determined matches, custodian profiles that include at least a portion of the data associated with the custodian. Additionally, the method includes receiving, at a computing device, a first user input configured to add, in unison, a plurality of custodians to a case based on the presented custodian profiles.

According to specific embodiments, the method further includes inputting, via a computing device processor, at least a portion of the data associated with the custodian into the case management system, wherein the input occurs automatically based on receipt of the first user input that adds the plurality of custodians to the case.

According to further specific embodiments, the method further includes receiving, at a computing device, a second user input configured to initiate an electronic discovery activity on the plurality of custodians added to the case and initiating, via a computing device processor, the electronic discovery activity on the plurality of custodians added to the case. The electronic discovery activity may be communication of a preservation notice to all or a portion of the custodians added to the case(s) and/or collection of data from devices associated with all or a portion of the custodians added to the case.

In specific embodiments of the method, determining matches includes determining more than one match between one of the identifying data items and the data associated with the custodians. For example, if the identifying data item is a first or last name, the database is likely to include more than one match for the name. Conversely, if the identifying data item is an employee number the database is likely to include a single match for the employee number. In such embodiments the method may further include receiving, at a computing device, a second user input that selects one of the custodian profiles for inclusion in the plurality of custodians to be added to the case. The second input/selection is based on the determination of more than one match between at least one of the identifying data items and the data associated with the custodians.

An apparatus for adding, in unison, a plurality custodians to an electronic discovery case defines further embodiments of the invention. The apparatus includes a computing platform including at least one processor and a memory. The apparatus further includes a bulk custodian entry application that is stored in the memory and executable by the at least one processor. The bulk custodian entry application includes a first user interface configured to receive a plurality of identifying data items. Each of the plurality of identifying data items is associated with one of a plurality of individuals potentially requiring addition to a case within the electronic discovery system. The identifying data items, may include, but are not limited to, a first name, a last name, an email address, an employee number, an operating system account number or the like.

The apparatus additionally includes a custodian match routine configured to access a database within the electronic discovery system, such as a Unified Directory or the like, which stores data associated with custodians, and determine matches between the plurality of identifying data items and the data associated with the custodians. Additionally, the apparatus includes a second user interface configured to present, for each of the determined matches, custodian profiles that include at least a portion of the data associated with the custodian and receive a first user input configured to add, in unison, a plurality of custodians to a case based on the presented custodian profiles.

In specific embodiments of the apparatus, the bulk custodian entry application further includes a custodian data upload routine configured to automatically upload at least a portion of the data associated with the custodian into a case in the case management system. The automatic upload/entry is based on receipt of the first user input that adds the plurality of custodians to the case.

In further specific embodiments the apparatus includes a preservation notice application stored in the memory, executable by the processor, and configured to receive a second user input operable to initiate communication of a preservation notice to each of the plurality of custodians added to the case. The preservation notice application includes a preservation notice routine configured to initiate the communication of the preservation notice to the plurality of custodians based on the second input.

In other specific embodiments the apparatus includes a data collection application stored in the memory, executable by the processor, and configured to receive a second user input operable to initiate collection of data from devices associated with each of the plurality of custodians added to the case. The data collection application includes a data collection routine configured to initiate collection of data from the devices associated with each of the plurality of custodians based on the second input.

In specific embodiments of the apparatus, the custodian match routine is further configured to determine more than one match between one of the identifying data items and the data associated with the custodians. In such embodiments, the second user interface is further configured to receive a second user input that selects one of the custodian profiles for inclusion in the plurality of custodians to be added to the case. The second user input/selection is based on the determination of more than one match between at least one of the identifying data items and the data associated with the custodians.

A computer program product that includes a computer-readable medium defines a further embodiment of the invention. The computer-readable medium includes a first set of codes for causing a computer to receive a plurality of identifying data items. Each of the plurality of identifying data items are associated with one of a plurality of individuals potentially requiring addition to a case within the electronic discovery system. The computer-readable medium additionally includes a second set of codes for causing a computer to access a database, such as a Unified Directory or the like, within the electronic discovery system. The database stores data associated with custodians in the electronic discovery system. In addition, the computer-readable medium includes a third set of codes for causing a computer to determine matches between the plurality of identifying data items and the data associated with the custodians and a fourth set of codes for causing a computer to present, for each of the determined matches, custodian profiles that include at least a portion of the data associated with the custodian. Moreover, the computer-readable medium includes a fifth set of codes for causing a computer to receive a first user input configured to add, in unison, a plurality of custodians to a case based on the presented custodian profiles.

Thus, further details are provided below for systems, apparatus, methods and computer program products for positive identification of individuals for addition, as custodians, to cases or matters within an electronic discovery system and for the addition, in bulk, of identified custodians to the cases or matters. By performing positive identification of multiple individuals via one specific identification procedure, without having to search multiple databases to verify the identity of an individual/custodian, the present invention adds efficiency to the e-discovery process. In addition to positively identifying custodians, the present invention provides for adding the identified custodians, simultaneously, in bulk, to a case or matter and, in some embodiments, uploading or otherwise transferring custodian profile data to the case management system/database, as need be.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
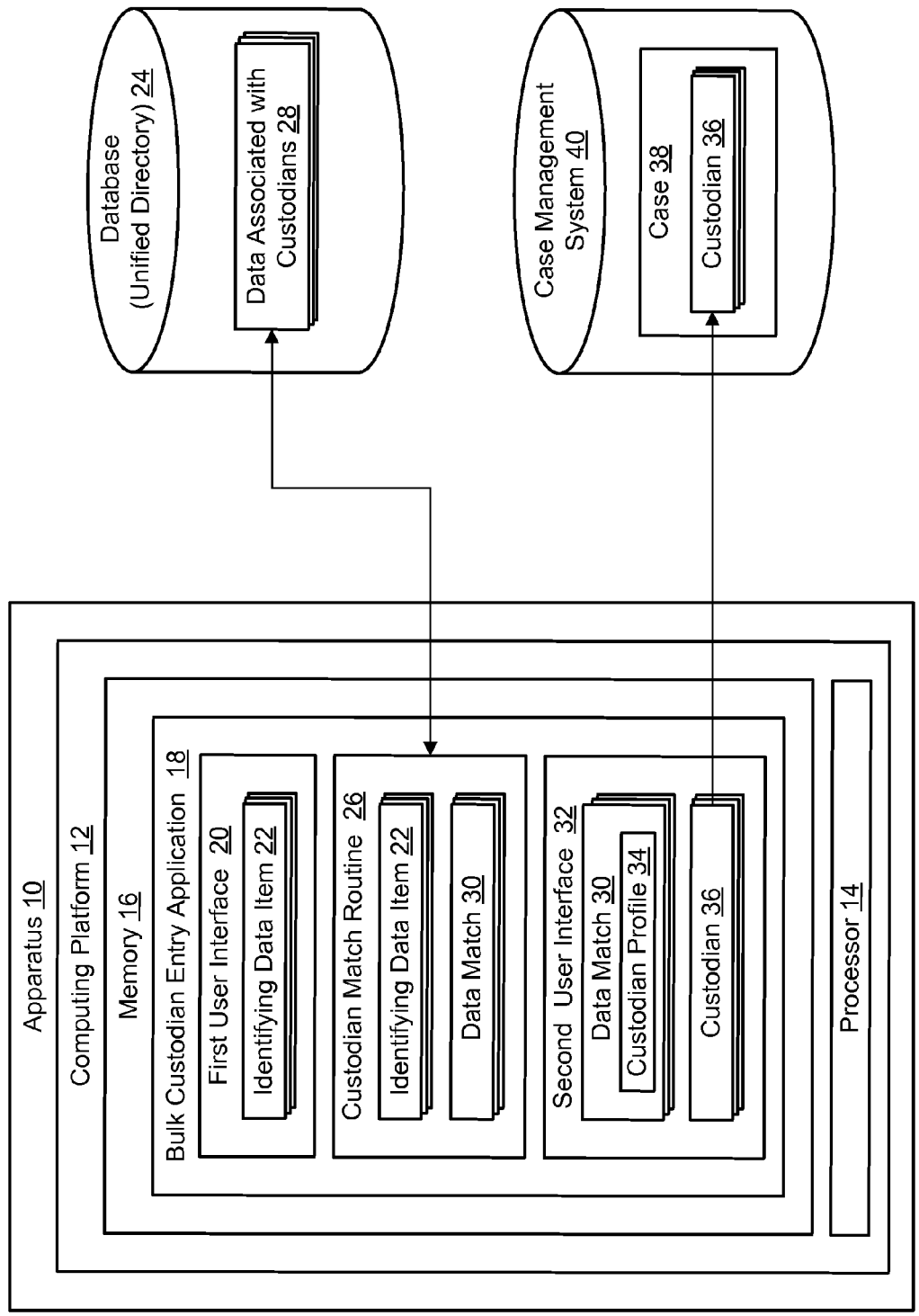
Figure 2:
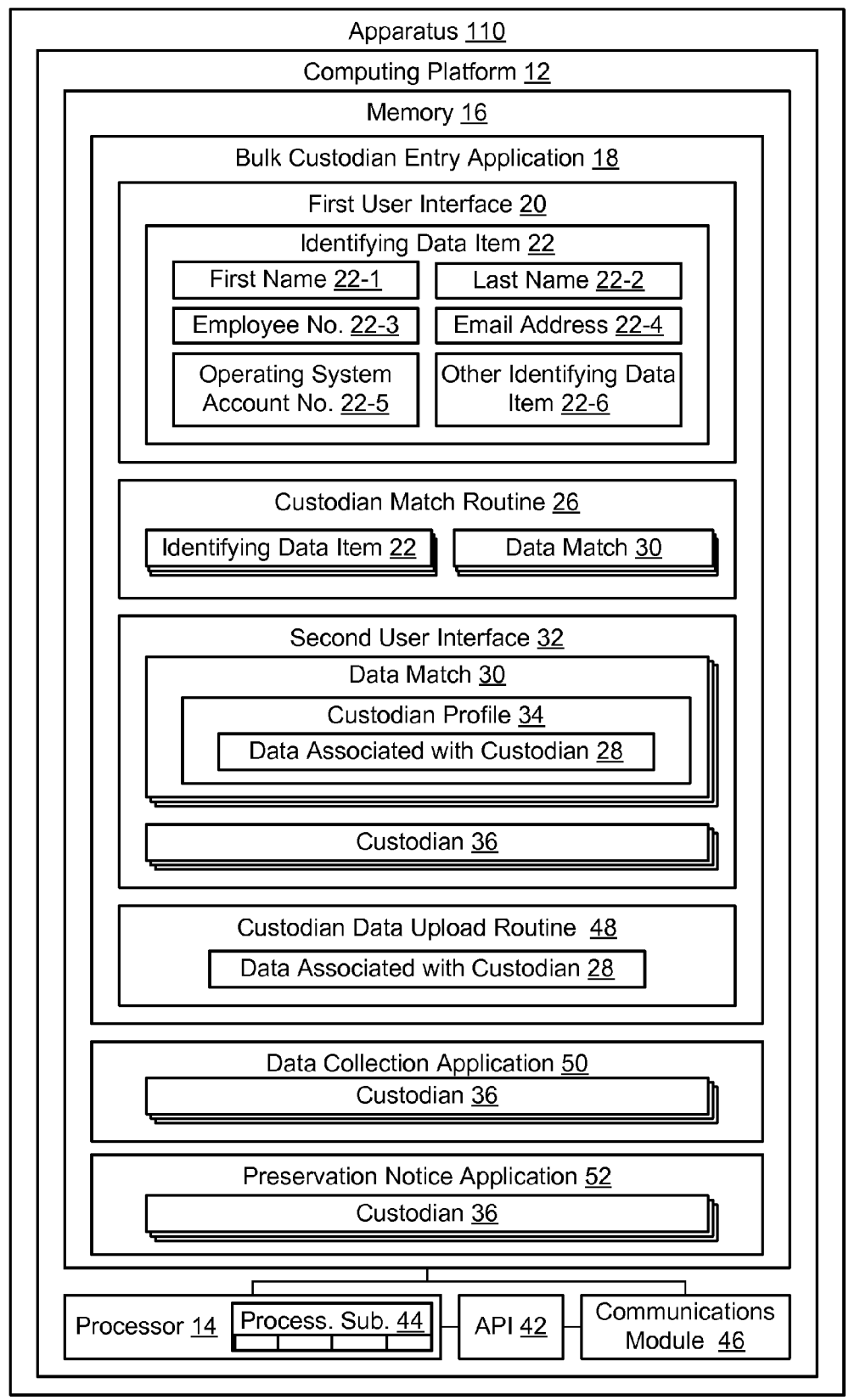
Figure 3:
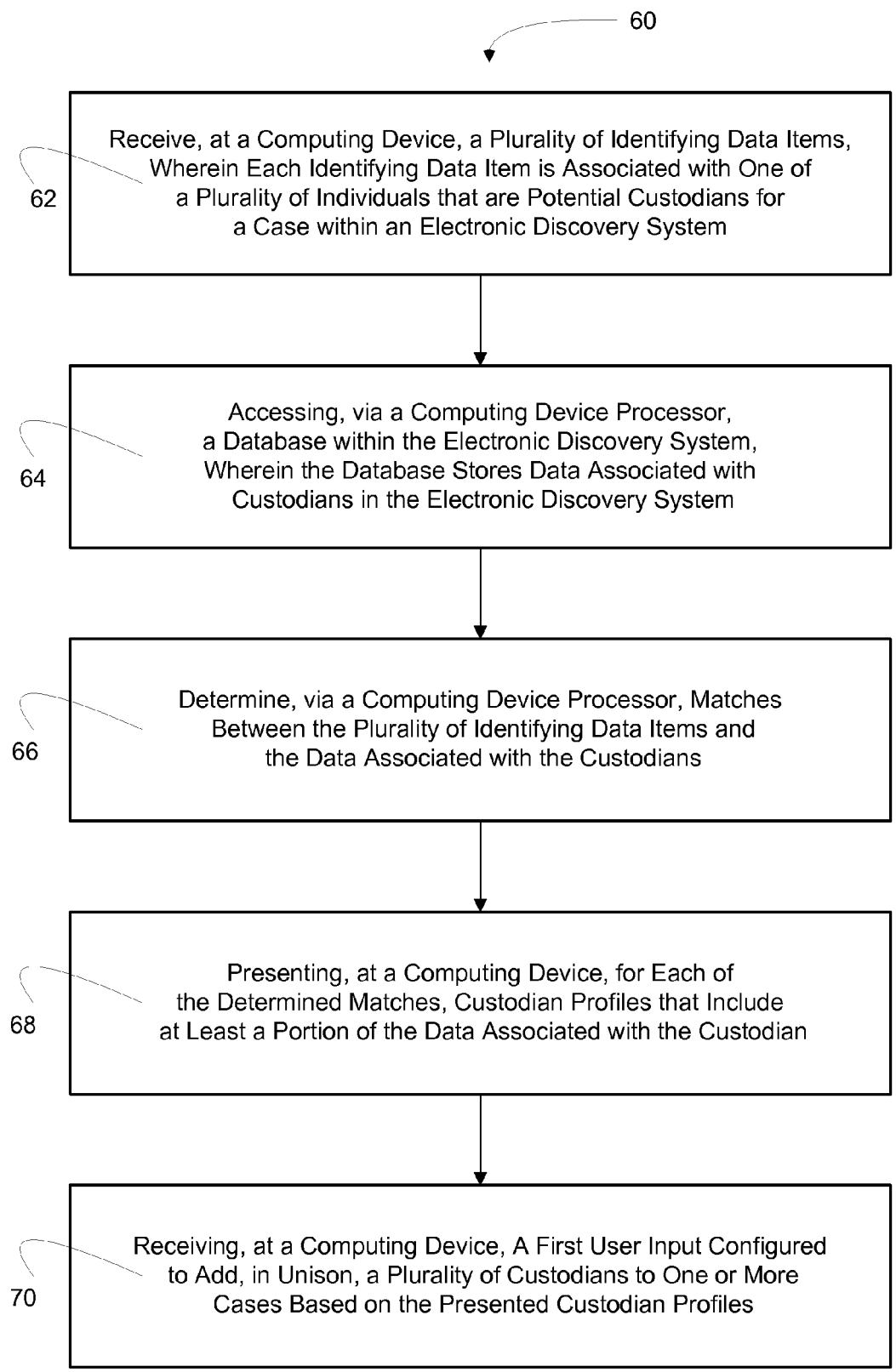
Figure 4:
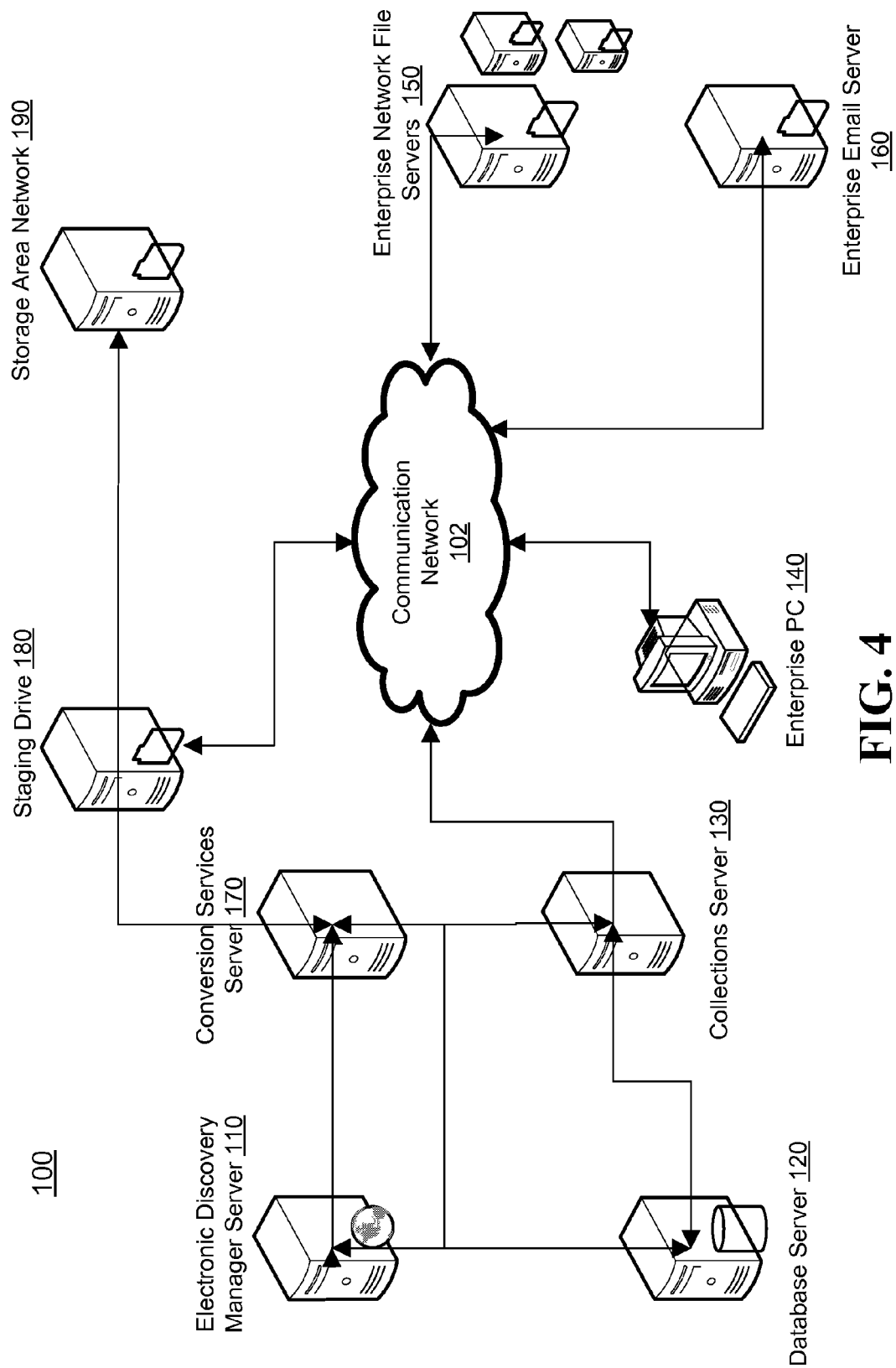
Figure 5:
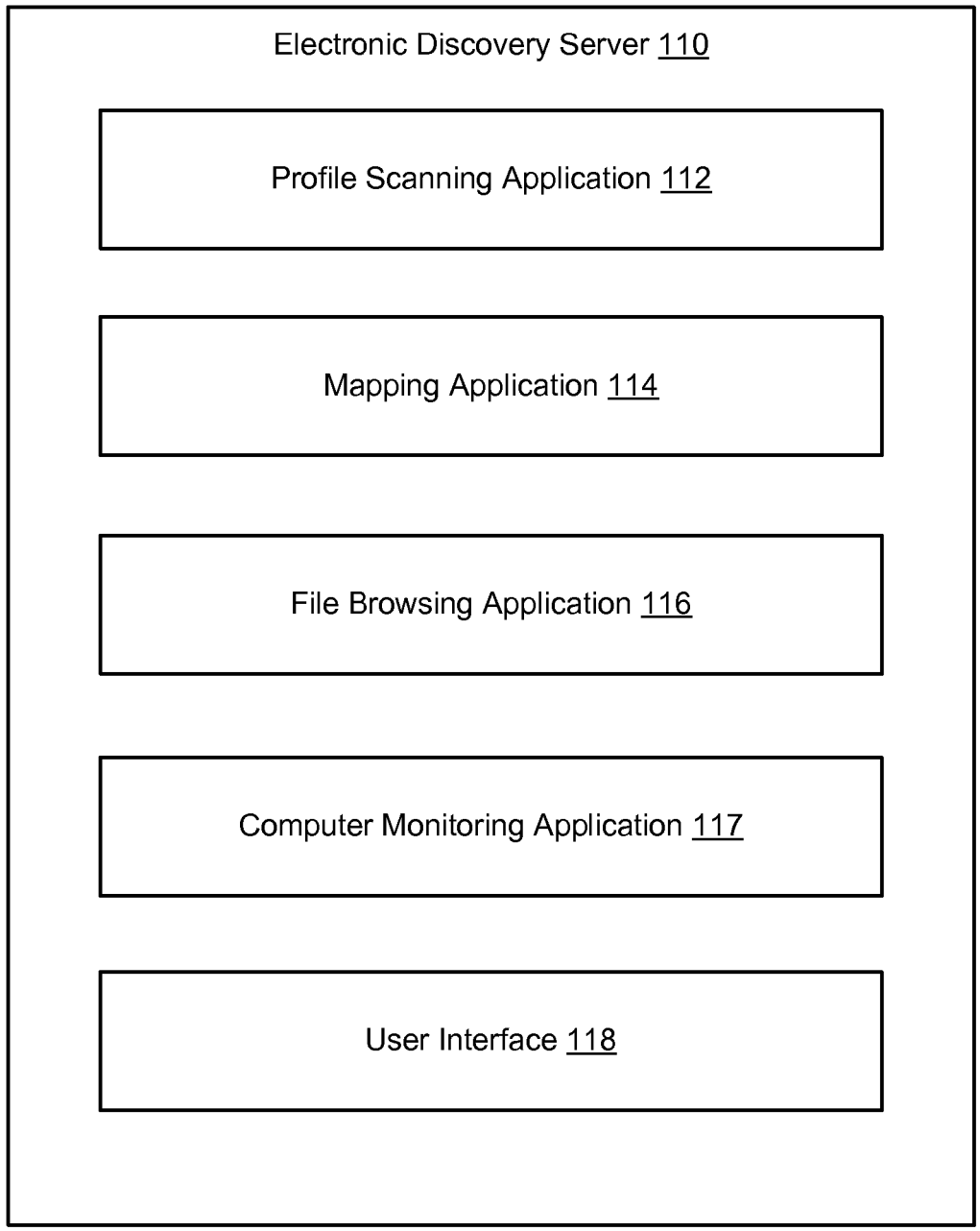
Figure 6:
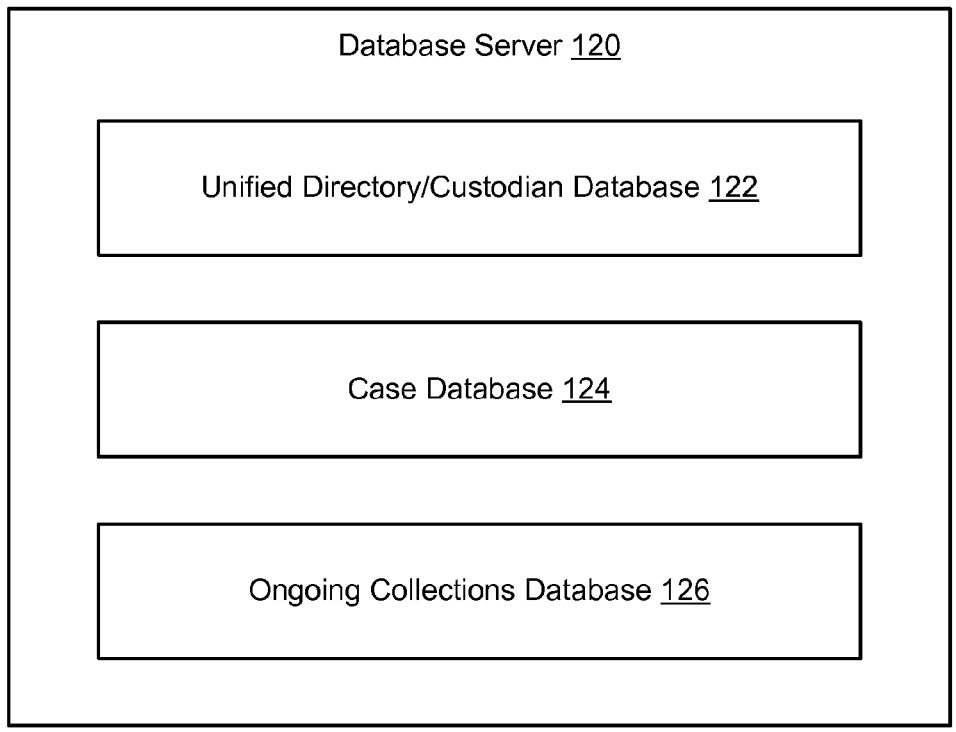
Figure 7:
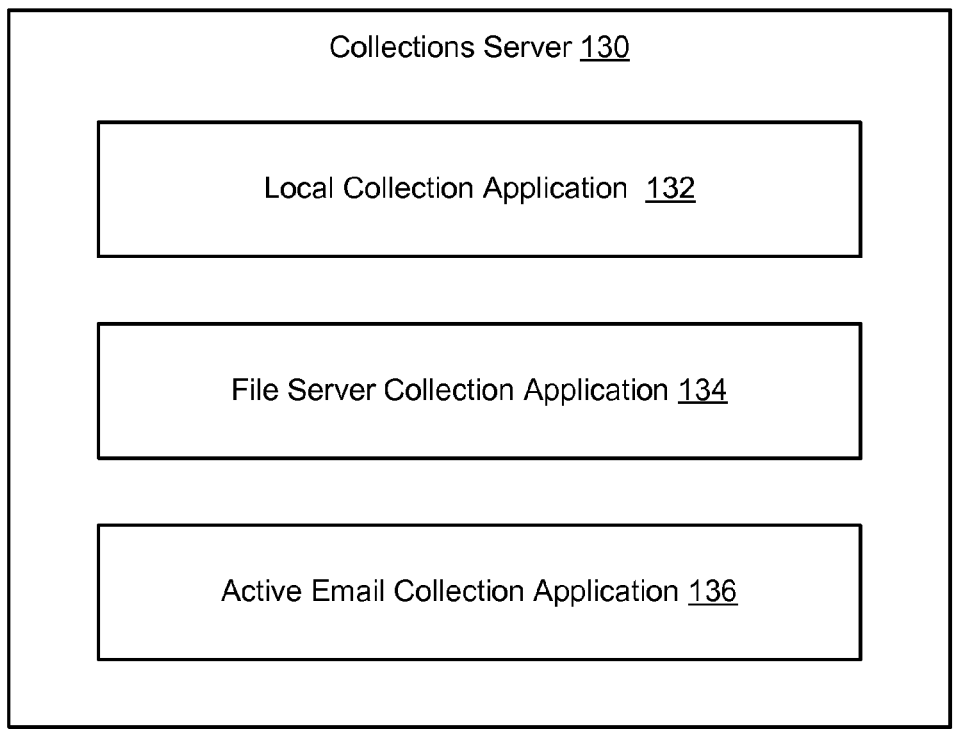
Figure 8:
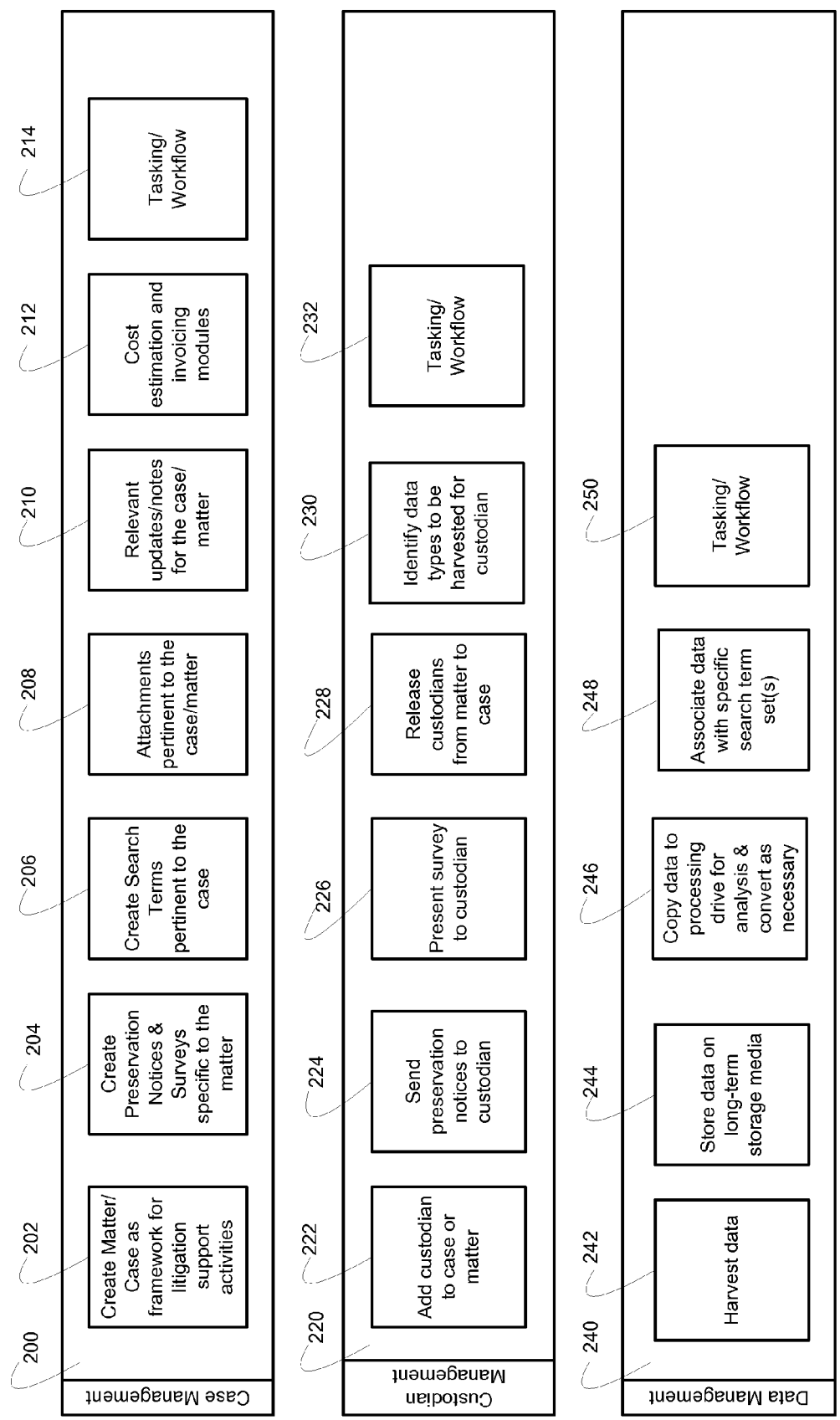
Figure 9:
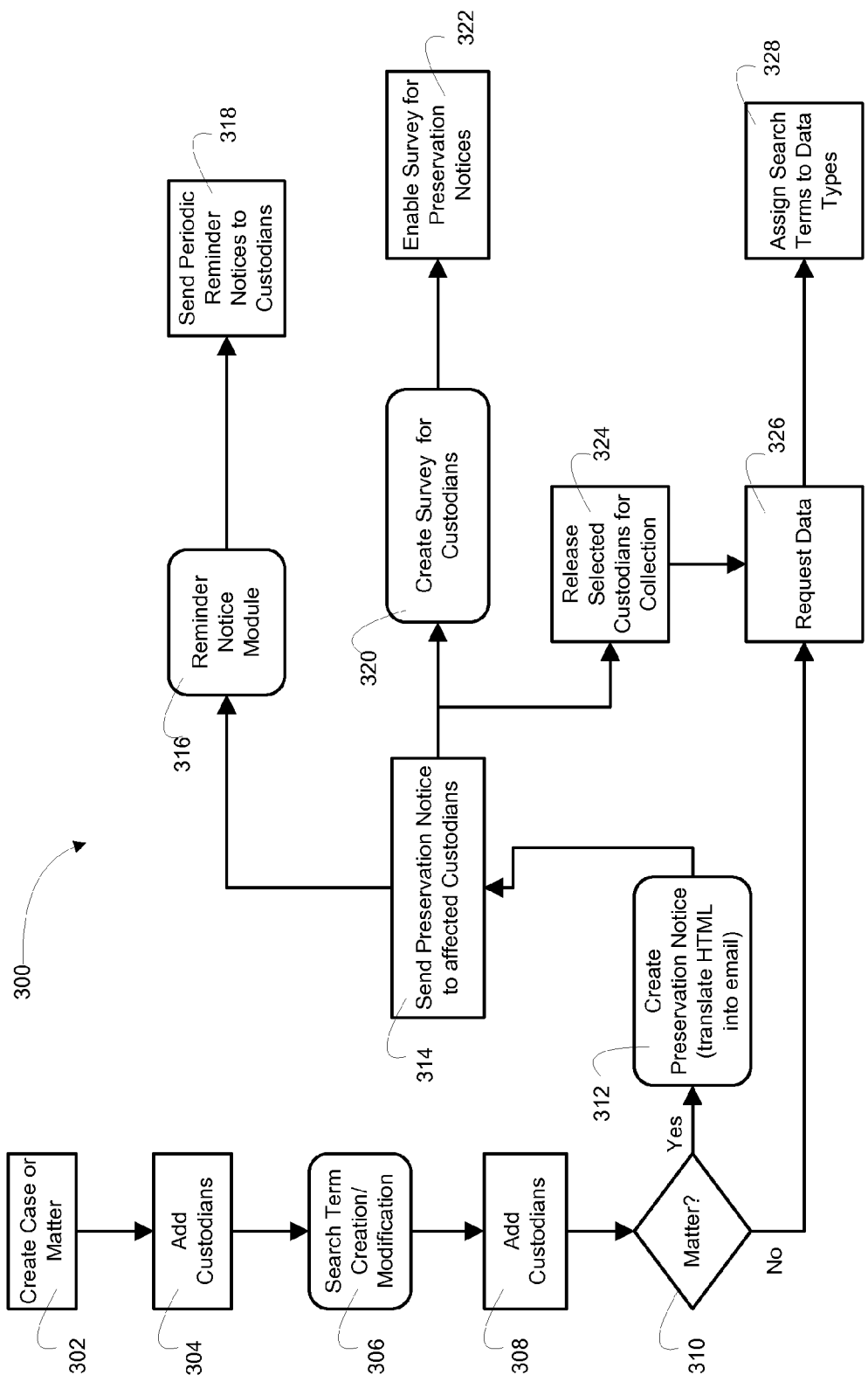
Figure 10:
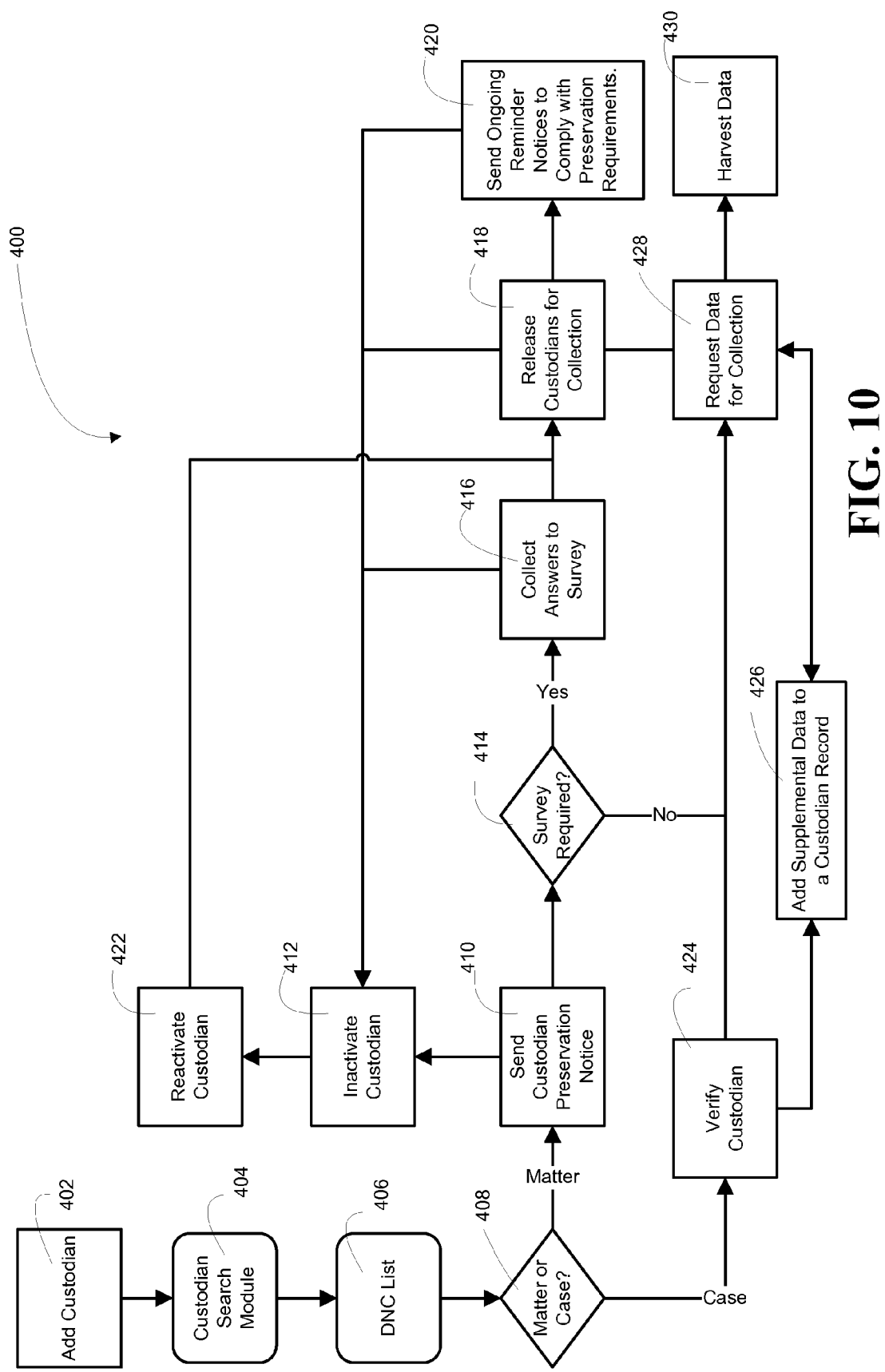
Figure 11:
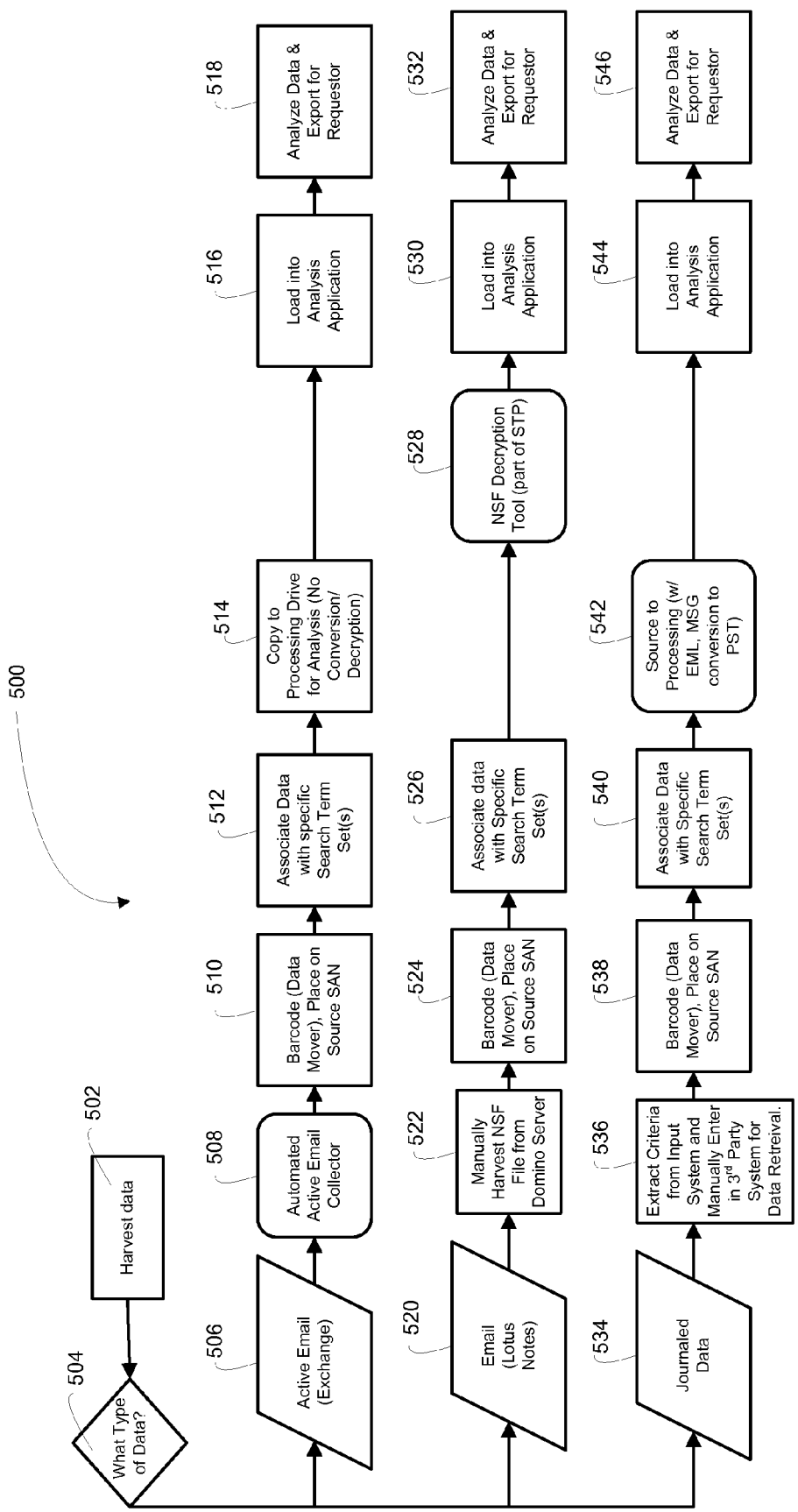
Figure 12:
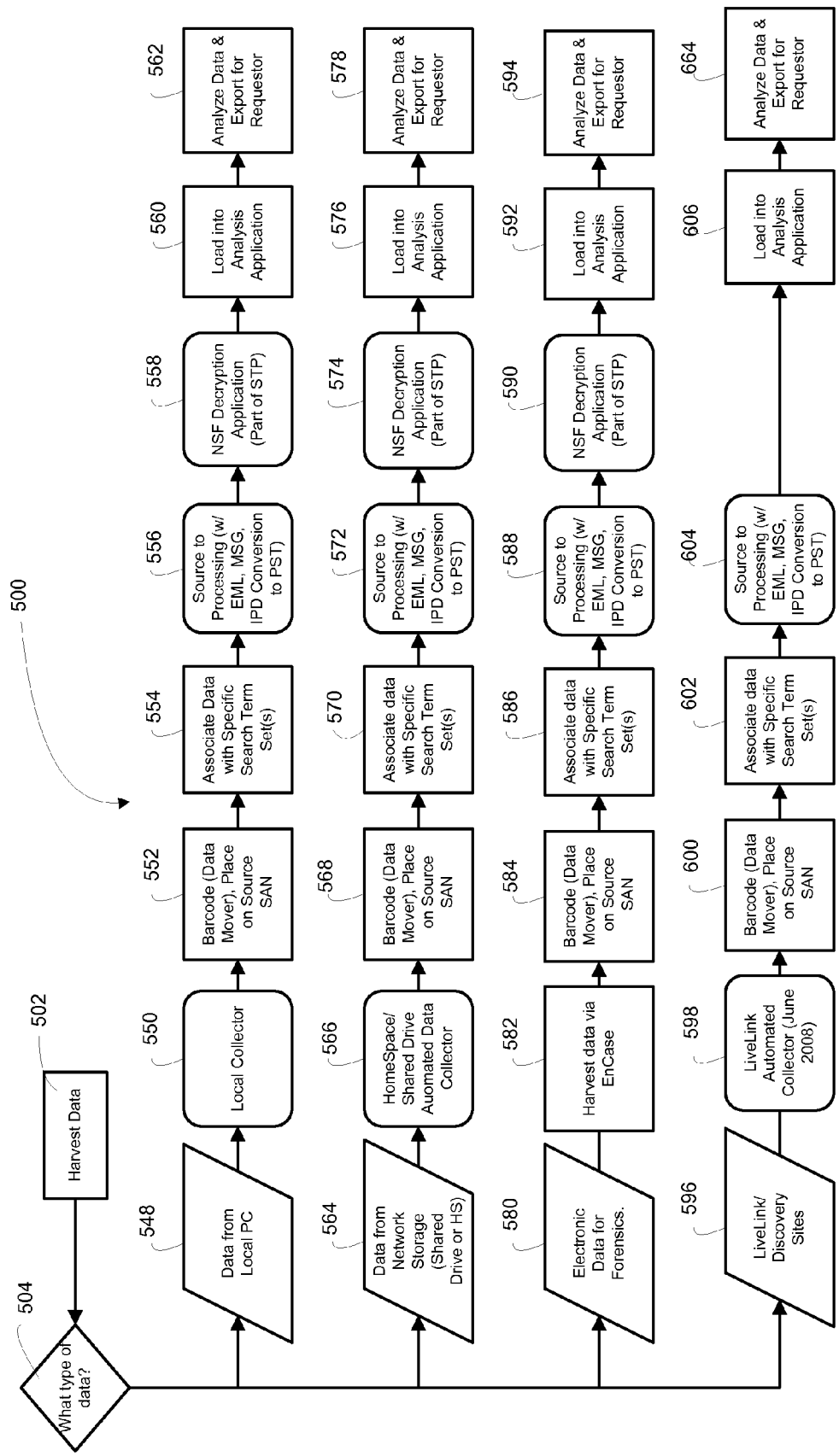

Having thus described embodiments of the invention in general terms, reference will now be made to the accompanying drawings, which are not necessarily drawn to scale, and wherein:

FIG. 1 is schematic diagram of an apparatus configured for determining cost estimates for an electronic discovery request, in accordance with embodiments of the present invention;

FIG. 2 is a more detailed block diagram of an apparatus configured for determining initial and dynamic cost estimated for an electronic discovery request, in accordance with embodiments of the present invention;

FIG. 3 is a flow diagram of a method for determining an initial cost estimate for an electronic discovery request, in accordance with embodiments of the present invention;

FIG. 4 is a block diagram of an enterprise-wide electronic discovery system highlighting computing device monitoring, in accordance with embodiments of the present invention;

FIG. 5 is a block diagram of an electronic discovery manager server, in accordance with embodiments of the present invention;

FIG. 6 is a block diagram of a database server in an electronic discovery system, in accordance with an embodiment of the present invention;

FIG. 7 is a block diagram of a collection server in an electronic discovery system, in accordance with an embodiment of the present invention;

FIG. 8 is block diagram illustrating electronic discovery management structure, in accordance with an embodiment of the invention;

FIG. 9 is a flow diagram of a method for initiating a case or matter including creating search terms, creating and sending preservation notices, sending reminder notices and creating and sending surveys to custodians, in accordance with embodiments of the present invention;

FIG. 10 is a flow diagram of a method for custodian management in an electronic discovery system, in accordance with an embodiment of the present invention; and FIGS. 11 and 12 are flow diagrams of methods for harvesting different data types in an electronic discovery system, in accordance with an embodiment of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, apparatus, systems, methods and computer program products are herein disclosed that provide for positive identification of individuals requiring addition, as custodians, to cases or matters within an electronic discovery system. The identification is performed simultaneously, in bulk, using disparate information related to the individuals. In this regard, individuals can be positively identified through one specific identification procedure, without having to search multiple databases to verify the identity of an individual/custodian. In addition to positively identifying custodians, the present invention provides for adding the identified custodians, simultaneously, in bulk, to a case or matter and, in some embodiments, uploading or otherwise transferring custodian profile data to the case management system/database, as need be. Such bulk addition of custodians lessens, and in some instances eliminates, the need to add custodians to the case on a one-by-one procedure. Additionally, embodiments of the present invention provide for configuring the system to perform automated e-discovery activities, such as communicating preservation notices, collecting data or the like, on the group of custodians based on their addition to the case.

FIG. 1 provides a schematic diagram of an apparatus 10 configured for providing identification and addition of multiple custodians to a case in an electronic discovery (i.e., e-discovery) system; in accordance with embodiments of the present invention. The apparatus 10, which may comprise more than one computing device, includes a computing platform 12 having at least one processor 14 and a memory 16. In specific embodiments of the invention the apparatus may take the form of an electronic discovery manager server 110 as shown in and described in relation to FIG. 4. The memory 16 of apparatus 10 stores bulk custodian entry application 18, which is executable by processor 14 and configured to identify potential custodians and add custodians, in unison (otherwise referred to as "in bulk"), to a case/matter within an electronic discovery system.

The bulk custodian entry application 18 includes first user interface 20 that is configured to receive a plurality of identifying data items 22. Each of the identifying data items 22 is associated with one of a plurality of individuals potentially requiring addition to a case within the e-discovery system. In this regard, the identifying data items may be a first name, a last name, an employee number, an email address, an operating system account number, such as a Windows® identifier/account number or the like or an other identifying data item that provides for searchable criteria within an e-discovery system database 24, such as a unified directory database (122 of FIG. 4). For example, an identifying data item 22 may include a job code or job title, in which case, the bulk custodian entry application will return all of the individuals/custodians in the e-discovery system having that particular job code or job title. The identifying data items may be manually inputted by a user/operator or the identifying data items may be uploaded from an external database.

The bulk custodian entry application 18 additionally includes custodian match routine 26 that is configured to access a data base 24 within the electronic discovery system, such as the unified directory database, which stores data associated with custodians 28. The custodian match routine 26 is further configured to determine data matches 30 between the identifying data items 22 and the data associated with the data associated with the custodians 28 stored in database 24. It should be noted that in many instances more than one data match 30 may result based on the type of the identifying data item 22. For example if the identifying data item 22 is a first or last name, it is highly likely that multiple data matches 30 will exist between the first or last name and the data associated with custodians 28 stored in the database 24. Conversely, if the identifying data item is an employee number, an email address, or an operating system account number, the match determination should result in a single data match 30, or in some instances no match, between the identifying data item 22 and the data associated with custodians 28 stored in the database 24.

Additionally, bulk custodian entry application 18 includes second user interface 32 that is configured to present, for each of the determined data matches 30, custodian profiles 34 that include a least a portion of the data associated with custodians 28. For example, the custodian profile 34 may include, but is not limited to, a city, state of residence and/or employment, a job title, a job code, a telephone number or the like. The information presented in the custodian profile 34 provides the user/operator the ability to identify the individual as the individual that they desire to add to the case within the electronic discovery system. Therefore, second user interface 32 is additionally configured for a user/operator to select multiple custodian profiles 34 from amongst the presented profiles and receive a user input that adds, in unison, the plurality of custodians 36 associated with the selected custodian profiles to a case/matter within the electronic discovery system. Thus, upon addition, the custodians 36 are linked to the case 38 within the case management system 40 of the e-discovery system.

Referring to FIG. 2, shown is a more detailed block diagram of apparatus 10, such as, for example, electronic discovery manager server 110 embodied within an electronic discovery enterprise system (shown in FIG. 4), according to embodiments of the present invention. The apparatus 110 is configured to provide identification and bulk addition of custodians to cases/matters within an e-discovery system. In addition to providing greater detail, FIG. 2 highlights various alternate embodiments. The apparatus 110 may include one or more of any type of computerized device. The present apparatus and methods can accordingly be performed on any form of computing device.

The apparatus 10 includes computing platform 12 that can receive and execute routines and applications. Computing platform 12 includes memory 16, which may comprise volatile and non-volatile memory, such as read-only and/or random-access memory (RAM and ROM), EPROM, EEPROM, flash cards, or any memory common to computer platforms. Further, memory 16 may include one or more flash memory cells, or may be any secondary or tertiary storage device, such as magnetic media, optical media, tape, or soft or hard disk.

Further, computing platform 12 also includes processor 14, which may be an application-specific integrated circuit ("ASIC"), or other chipset, processor, logic circuit, or other data processing device. Processor 14 or other processor such as ASIC may execute an application programming interface ("API") 42 that interfaces with any resident programs, such as bulk custodian entry application 18, data collection application 50, preservation notice application 52 or the like stored in the memory 16 of the apparatus 110.

Processor 14 includes various processing subsystems 44 embodied in hardware, firmware, software, and combinations thereof, that enable the functionality of apparatus 110 and the operability of the apparatus on a network. For example, processing subsystems 44 allow for initiating and maintaining communications and exchanging data with other networked devices. For the disclosed aspects, processing subsystems 44 of processor 14 may include any subsystem used in conjunction with bulk custodian entry application 18, data collection application 50, preservation notice application 52 or subcomponents or sub-modules thereof.

Computer platform 12 additionally includes communications module 46 embodied in hardware, firmware, software, and combinations thereof, that enables communications among the various components of the apparatus 110, as well as between the other devices in the electronic discovery system. Thus, communication module 46 may include the requisite hardware, firmware, software and/or combinations thereof for establishing a network communication connection.

As previously noted, the memory 16 of computing platform 12 stores bulk custodian entry application 18, which is executable by processor 14 and configured to identify potential custodians and add custodians, in unison (otherwise referred to as "in bulk"), to a case/matter within an electronic discovery system.

The bulk custodian entry application 18 includes first user interface 20 that is configured to receive a plurality of identifying data items 22. Each of the identifying data items 22 is associated with one of a plurality of individuals potentially requiring addition to a case within the e-discovery system. As shown in FIG. 2, the identifying data items may be a first name 22-1, a last name 22-2, an employee number 22-3, an email address 22-4, an operating system account number 22-5, such as a Windows® identifier/account number or the like, other identifying data item 22-6 that provides for searchable criteria within an e-discovery system database (24 of FIG. 1), such as a unified directory database (122 of FIG. 4) or any combinations thereof.

The bulk custodian entry application 18 additionally includes custodian match routine 26 that is configured to access a database within the electronic discovery system, such as the unified directory database, which stores data 28 associated with custodians. The custodian match routine 26 is further configured to determine data matches 30 between the identifying data items 22 and the data associated with the data 28 associated with the custodians. As previously noted, in many instances more than one data match 30 may result based on the type of the identifying data item 22. For example if the identifying data item 22 is a first or last name, it is highly likely that multiple data matches 30 will exist between the first or last name and the data 28 associated with custodians. Conversely, if the identifying data item is an employee number, an email address, or an operating system account number, the match determination should result in a single data match 30, or in some instances no match, between the identifying data item 22 and the data 28 associated with custodians.

Additionally, bulk custodian entry application 18 includes second user interface 32 that is configured to present, for each of the determined data matches 30, custodian profiles 34 that include a least a portion of the data 28 associated with the custodians. For example, the custodian profile 34 may include, but is not limited to, a city, state of residence and/or employment, a job title, a job code, a telephone number or the like. The information presented in the custodian profile 34 provides the user/operator the ability to identify the individual as the individual that they desire to add to the case within the electronic discovery system. Therefore, second user interface 32 is additionally configured for a user/operate to select multiple custodian profiles 34 from amongst the presented profiles and receive a user input that adds, in unison, the plurality of custodians 36 associated with the selected custodian profiles to a case/matter within the electronic discovery system.

In alternate embodiments, the bulk custodian entry application 18 includes custodian data upload routine 48 that is configured to upload or otherwise transfer at least a portion of the data 28 associated with the added custodian from the database 24, such as the unified directory, to the case management system (40 in FIG. 1).

In other alternate embodiments of the invention, the electronic discovery system may be configured such that the addition of the plurality of custodians to a case automatically prompts an e-discovery activity to be performed on the added group of custodians. Thus, the memory 16 of apparatus 110 may include data collection application 52 configured to automatically collect data, such as active email data or the like, from the group of added custodians 36 based on the addition of the custodians to the case. In addition, the memory 16 of apparatus 110 may include preservation notice application 54 configured to automatically communicate one or more preservation notices to the group of added custodians 36 based on the addition of the custodians to the case.

Referring to FIG. 3 a flow diagram is depicted of a method 60 for positively identifying individuals to add, as custodians, to a case in an electronic discovery system and adding, in unison, a plurality of custodians the case, in accordance with embodiments of the present invention. At Event 62, a plurality of identifying data items are received by a computing device. Each of the identifying data items is associated with one of a plurality of individuals that are potential custodians for a case within the electronic discovery system. The identifying data item is any data item searchable within an e-discovery database, such as a unified directory or the like. Thus, identifying data items may include, but are not limited to, first name, last name, email address, employee number, telephone number, operating system account number and the like.

At Event 84, an electronic discovery database, such as a unified directory is accessed by a computing device processor. The database is configured to store data associated with custodians within the electronic discovery system. The custodians may be active custodians assigned to current cases/matters or the custodians may be historical custodians previously assigned to cases that are not currently active.

At Event 86, data matches are determined between the plurality of identifying data items and the data associated with the custodians stored in the database. As previously noted one identifying data item may provide for more than one data match. For example, a first or last name will typically result in more than one data match.

At Event 88, for each determined data match, a custodian profile is presented at a computing device. The custodian profile includes at least a portion of the data associated with the custodian. The data that is presented in the custodian profile provides a user adequate information to identity the individual and the desired individual that is desired to be linked to the case/matter at hand.

At Event 90, a first user input is received at a computing device that is configured to add, in unison, a plurality of custodians to a case. The custodians being selected by a user based on the presented custodian profiles.

In optional Events (not depicted in FIG. 3), at least a portion of the data associated with the added custodians mat be uploaded or otherwise transferred from the database/unified directory to the case file within a case management system of the e-discovery system. In other embodiments, the addition of the group of custodians may automatically prompt initiation of an e-discovery activity, such as communicating preservation notices to the group of added custodians and/or initiating electronic collection of data from the added custodians.

As a means of providing an overview of a composite, enterprise-wide electronic discovery system, which may be implemented in conjunction with the computer monitoring of network status described above, FIGS. 4-12 are herein provide and described in detail. It should be noted that the system shown and described in relation to FIGS. 4-12 are by way of example only and, as such, presently described embodiments of the invention may be embodied within other electronic discovery systems or only implement select portions of the electronic discovery system herein described.

FIG. 4 illustrates an exemplary electronic discovery system 100 in accordance with an embodiment of the invention. In some embodiments, the environment of the electronic discovery system 100 is the information technology platform of an enterprise, for example a national or multi-national corporation, and includes a multitude of servers, machines, and network storage devices in communication with one another over a communication network. In particular, an electronic discovery management server 110, at least one database server 120, a collections server 130, enterprise personal computers 140, enterprise file servers 150, including at least one personal network storage area and at least one shared network storage area, enterprise email servers 160, a conversion services server 170, a short-term staging drive 180, and a long-term network storage network 190 are all in communication over a communication network 102. The communication network 102 may be a wide area network, including the Internet, a local area network or intranet, a wireless network, or the like.

As shown in the block diagram of FIG. 5, the electronic discovery management server 110 provides user interface management for via user interface 118. In some embodiments, the electronic discovery management server 110 is a web server that can be accessed via a web browser. In one particular embodiment, the electronic discovery management server 110 is an intranet website server that may be accessed utilizing a web browser on a machine within the enterprise. Through the electronic discovery management server 110, the user interface 118 may be presented to a user for the purposes of managing the electronic discovery process and all processes described herein that are inherent thereto. For illustrative purposes, it may be assumed herein that the primary user interacting with the user interface 118 is an employee or contractor of the company who serves an electronic discovery management role, and hereafter is referred to as the "e-discovery manager." As discussed in greater detail below, the e-discovery manager may utilize the user interface 118 to manage cases, custodians, collections, and collected data. It should be appreciated, however, that any individual could use the user interface 118 to perform the manual functions herein attributed to the e-discovery manager, and, indeed, that an automated process could perform those functions as well.

Referring again to FIG. 4, the electronic discovery management server 110 is in communication with the database server 120 and the collections server 130 via the communication network 102. The database server 120, as shown in the block diagram of FIG. 6, is configured to provide database services for the electronic discovery management server 110, including housing the Unified Directory/custodian database 122, which includes data relating to individual custodians, the case database 124, which includes data relating to particular cases, and ongoing collections database 126, which includes data relating to collections being undertaken by the collections server 130. Each of the foregoing databases within the database server 120 is discussed in detail below. It should be understood that multiple database servers could be employed instead of a single database server, and reference to a single database server is for illustrative and convenience purposes only. For example, the Unified Directory 122 could be stored in one database server and the ongoing collections data 126 could be stored in another database server.

Regardless of the number of database servers employed, it is an object of embodiments of the present invention that data relating to custodians and cases be stored in the database server 120 independently. While custodian data in the Unified Directory 122 and case data in the case database 124 may be linked or correlated within the database server 120, for example, when custodians are assigned to particular cases, custodians may be managed separately from cases. Therefore, when a case is initialized and a custodian is assigned to the case, information for that custodian (such as data storage locations for that custodian) is accessed by the electronic discovery management server 110 in the Unified Directory 122 in the database server 120 and linked to the particular case, rather than manually input by the e-discovery manager into the case.

Furthermore, in addition to separating (but allowing linkage of) custodian management and case management processes, and as discussed further below, data management processes relating to the collection of data from custodian storage locations during electronic discovery are also separated from case management and custodian management processes. In this regard, the data collected from a particular custodian is stored separately from both the custodian information and any relevant case information (as discussed below, it is stored in long-term network storage network 190), but is linked to a custodian, which is in turn linked to one or more cases. This is advantageous because in the event a particular custodian is assigned to multiple cases, data collected from the custodian may be shared with the other case(s) to which the custodian is assigned. Therefore, the various processes and components of the electronic discovery system 100 may be categorized within one of case management, custodian management, or data management. And even though cases, custodians, and collected data may all be managed separately, there are necessarily links between the various data stores to allow management of the overall electronic discovery process.

Custodian

With regard to custodian management, according to some embodiments of the present invention, the Unified Directory/custodian database 122 houses information relating to all potential custodians within the enterprise and the locations where those custodians store data. The information stored in the Unified Directory 122 may include for a particular custodian, for example, the custodian's name, position, human resources identifier (a unique number for each employee of the enterprise), employment location, domain, email addresses, network user identification, personal computer(s) name, paths of network storage devices used by the custodian, including Shared Drives and HomeSpaces, work history, related persons (such as managers, team members or subordinates), and any other information that may be relevant to the discovery process. Since the human resources identifier is always unique for each custodian, in some embodiments, the Unified Directory 122 may be organized around the human resources identifier. All of the information relating to how the Unified Directory 122 is generated is a multi-step process that utilizes multiple applications and methods of identifying relevant information.

For example, the electronic discovery management server 110 or the database server 120 may interface with the computer databases of the human resources computer systems of the enterprise to copy the information from the human resources databases into the Unified Directory 122. In some embodiments, the electronic discovery management server 110 may also reach out to a network directory, such as Windows Active Directory, to identify network resources related to particular custodians and integrate this information into the custodian entries including the copied human resources information. Information for the Unified Directory 122 may also be obtained from the managers of the information technology network, i.e., those individuals responsible for setting up email accounts for custodians and managing the various file servers of the enterprise. Furthermore, in addition to retrieving information in the manners described above, in some embodiments, information in the Unified Directory 122 is generated through applications initialized and/or deployed by the electronic discovery management server 110. In particular, in some embodiments, as shown in FIG. 4, a profile scanning application 112, and a mapping application 114 are provided.

The profile scanning application 112 may be deployed by the electronic discovery management server 110 and is configured to crawl the communication network 102, scan each of the enterprise personal computers 140, and transmit to the database server 120 identifying information about each computer, such as computer name and IP address, and a list of all profiles, including demographics information, (or network user identification) associated with each computer. According to different embodiments, the profile scanning application 112 may be run on the electronic discovery management server 110, the collection server 130, or another server in the communication network 102. In some embodiments, the profile scanning application 112 is further configured to identify and transmit to the database server 120 the most recent date and time at which a particular profile was logged on to the machine. When information relating to a particular computer is received by the database server 120, the database server 120 uses the profile information, which may include several user identifications, to link the particular computer to the custodians in the Unified Directory 122 associated with those user identifications. The database server 120 may also record in each custodian's entry in the Unified Directory 122 the last time the computer was accessed by the custodian, according to the profile information transmitted by the profile scanning application 112. Thus, the profile scanning application 112 ultimately generates a list of personal computers used by each custodian, and this list may be presented to the e-discovery manager when a collection of a custodian's local machine(s) is initialized, as discussed in detail below.

In accordance with some embodiments of the invention, the mapping application 114 is configured to crawl the communication network 102 and examine the enterprise file servers 150 residing on the communication network 102 to locate and identify the path of any personal network storage area on each server. As used herein, a personal network storage area is a network storage area associated with a single user who reads data from or writes data to it. Personal network storage areas may be in the form of network storage devices or folders or other resources within a network storage device and may be referred to hereafter for clarity purposes as "HomeSpaces." According to different embodiments, the mapping application 114 may be run on the electronic discovery management server 110, the collection server 130, or another server in the communication network 102. In some embodiments, the mapping application 114 is a Windows service that is scheduled to execute through use of Windows Scheduled Task. As the mapping application 114 crawls the communication network 102, it is configured to examine each file server and transmit to the database server 120 the path of any network storage area within the plurality of servers 134 that it positively identifies as a HomeSpace. In some embodiments, the mapping application 114 is configured to explore the enterprise file servers 150 by obtaining and reviewing the directories on each server and evaluating the paths of each network storage area therein, including folders and other storage devices and resources.

With regard to identifying a particular network storage area as a HomeSpace, according to some embodiments, the mapping application 114 is configured to utilize conventional naming techniques for paths in the communication network 102 to identify those paths of network storage areas within the enterprise file servers 150 that include an indicator, based on the conventional naming techniques, that the particular storage areas associated with those paths are accessed and used by only one user, and are therefore HomeSpaces. In accordance with some embodiments of the invention, each user of the communication network 102 is assigned to at least one user identification and those user identifications are the indicators that the mapping application 114 attempts to locate within paths when identifying HomeSpaces. In such embodiments, it is the convention that the paths of HomeSpaces on the communication network 102 include the user's user identification. On the other hand, paths of shared network storage areas do not include user identifications. Therefore, the mapping application 114 may explore the directories of each server within the plurality of servers, evaluate each path in turn, and make a determination as to whether or not the path includes a user identification.

If it is determined that the path includes the designated indicator, for example, a user identification, the mapping application 114 is configured to positively identify the particular network storage area identified by that path as a HomeSpace and transmit to the database server 120 the particular user identification and the path of the HomeSpace. When that information is received by the database server 120, the database server 120 uses the user identification to link the particular HomeSpace to the custodian in the Unified Directory 122 associated with that user identification. In some embodiments, the mapping application 114 is also configured to recognize and transmit, and the database server 120 is configured to house, an indication of the last time the HomeSpace was accessed by the particular user, for example, the last time any data was read from and/or written to the HomeSpace. Additionally, in some embodiments, the mapping application 114 is configured to recognize when multiple paths map to the same network storage area. The collection server 130 compares paths for the same user to determine if duplicative entries exist. This advantageously enables avoidance of multiple collections of the same data. Thus, the profile scanning application 112 ultimately generates a list of HomeSpaces used by each custodian, and this list may be presented to the e-discovery manager when a collection of a custodian's HomeSpaces is initialized, as discussed in detail below.

In addition to storing a list of personal computers and HomeSpaces used by a particular custodian, which lists were generated by the profile scanning application 112 and the mapping application 114 respectively, in accordance with some embodiments of the present invention, the database server 120 is also configured to store a list of any shared network storage areas used by the custodian. As used herein, a shared network storage area is a network storage area associated with multiple users who read data from and/or write data to it. Shared network storage areas may also be in the form of network storage devices or folders or other resources within network storage devices and may be referred to hereafter for clarity purposes as "Shared Drives." The user interface 118 is configured to receive a path of a Shared Drive input by the e-discovery manager and store the path in the Unified Directory 122 in relation to one or more custodians' human resources identifier(s). More particularly, in some embodiments, once a particular user of the communication network 102 is chosen for the collection process, the e-discovery manager may undertake to identify the particular shared network resources that that individual is using, and eventually, the paths associated with those shared network resources. This may be accomplished through conversations with the particular individual, by utilizing data returned from the local collection application 132 executed on collection server 130 (shown in the block diagram of FIG. 7) deployed to the particular user's machine (as discussed in detail below), and/or by utilizing a file browsing application 116 executed on electronic discovery manager server 110 (as shown in FIG. 5).

According to some embodiments of the present invention, the file browsing application 116 is configured to be utilized by the e-discovery manager through the user interface 118. The file browsing application 116 gives the e-discovery manager elevated authority within the communication network 102 to access, in a limited manner, the enterprise file servers 150 within the communication network 102. While the file browsing application 116 may not allow access to the actual files stored on certain file servers, it allows the e-discovery manager to browse through the directories of the file servers 150, locate files that have been accessed by the custodian, and determine the size of the files. In accordance with some embodiments, the e-discovery manager may initially have a general idea of a particular file server within the enterprise file servers 150 that the custodian has used in the past. For example, the custodian may communicate to the e-discovery manager a particular folder name and/or drive name on which he/she has stored files. Additionally, in some embodiments, the e-discovery manager may have already undertaken a local collection process on the custodian's machine, wherein the local collection application 132 returned a list of the network resources that the user of that machine has used. In that event, the e-discovery manager may be aware of the particular drive referenced by the user. The e-discovery manager may then employ the file browsing application 116 to browse out to the particular drive mentioned, scan the folders for any folder having a name resembling that name given by the user, identify any particular files created by and/or accessed by the user, determine the size of such files, and retrieve the path of any folder (or Shared Drive) including data belonging to the user.

The retrieved paths of the Shared Drives may then be added, either manually or automatically, to the Unified Directory 122 in the database server 120. Thus, the Unified Directory 122 may store in connection with one custodian (and in particular in relation to the custodian's human resources identifier) a list of the personal computers, HomeSpaces, and Shared Drives associated with that custodian. Each of these locations is a potential source of data stored by the custodian, and once an investigation or collection of a custodian is initiated, the location information stored in the Unified Directory 122 may be accessed to determine the particular storage locations that need to be addressed during the investigation/collection. This is advantageous as it allows a completely automated investigation/collection process, rather than relying on the e-discovery manager to manually input the targeted machines and file servers at the time of collection.

It should be noted that the Unified Directory 122 may be regularly or continuously updated as new information is gathered using the applications described herein. More particularly, the electronic discovery management server 110 may be configured to automatically retrieve data from the human resources databases and Active Directory and any other relevant sources, such as information technology directories or lists, as well as deploy the profile scanning application 112 and the mapping application 114, at regularly scheduled intervals. Alternatively, rather than periodically retrieving data from the various data sources such as the human resources databases, the system 100 may be configured such that the database server 120 is continuously interfacing with the data sources such that the Unified Directory 122 is updated in real-time as the data within the data sources update. In either instance, each of the feeds of information into the Unified Directory 122 is regularly updated to ensure that the data in the Unified Directory 122 is current.

In some embodiments, the database server 120 is configured such that all historical data relating to a custodian is stored in relation to that custodian's human resources identifier in the Unified Directory 122. Thus, when the feeds of information into the Unified Directory 122 are updated, in the event data relating to the custodian has updated, the database server 120 is configured to store in the Unified Directory 122 the new data and any relevant metadata, including, for example, the time and date of the update, as well as maintain a record of the old data so that it is still a part of the custodian's profile in the Unified Directory 122. For example, in the event the profile scanning application 114 identifies a new personal computer associated with a custodian and one of the personal computers associated with the custodian previously is no longer identified, the database server 120 is configured to store in the Unified Directory 122 the information for each computer, as well as indications as to when the new computer was first identified and when the old computer was no longer identified. In this way, the custodian profile within the Unified Database 122 may include a history of the personal computers used by the custodian. Such information may be relevant at the time of investigation or collection of the custodian.

One feed of information into the Unified Directory 122 which is particularly relevant to electronic discovery is employment status. According to some embodiments, when the feed of information from the human resources databases to the Unified Directory 122 includes an update as to employment status of a particular custodian, the electronic discovery management server 110 is configured to recognize the update and possibly perform particular functions in response. More specifically, in the event it is recorded in the Unified Directory 122 that the employment status of a particular custodian updates from active to terminated, the electronic discovery management server 110 is configured to determine whether the custodian is assigned to any case or matter, and, if so, to transmit to the designated manager or contact for the case or matter an electronic communication notifying the manager of the terminated status and inquiring as to whether the manager would like the terminated custodian's data collected. In the event the manager responds in the affirmative, the electronic discovery management server 110 is configured to automatically initiate the various collection processes of the present invention. Therefore, the custodian's data may be advantageously collected prior to any destruction or unavailability that could be caused by the termination. Alternatively, in other embodiments, the electronic discovery management server 110 may not communicate with the manager and may automatically initiate collection upon recognizing an update in employment status.

Case

With regard to case management processes, according to some embodiments, a case may be initialized by the e-discovery manager utilizing the user interface 118. In this regard, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager), custodians, etc. The electronic discovery management server 110 is configured to store this information in the case database 124 in the database server 120. The case database 124 is configured to house this information such that all information relating to a particular matter or case is related within the case database 124 and a user can use the user interface 118 to view a profile of the matter or case including all the information.

Once the matter and/or case has been initialized, the e-discovery manager may add custodians to the matter or case. In some embodiments, the electronic discovery management server 110 is configured to add numerous custodians to a single matter or case at one time. In this regard, the e-discovery manager may use the user interface 118 to enter in identifying information about the custodians. The identifying information for each custodian does not have to be of the same type. For example, a name may be entered for one custodian, an email address for another, a network user identification for another, and a human resources identifier for another. The user interface 118 is configured to receive the identifying information in different input areas depending upon the type of identifying information being received. The electronic discovery management server 110 is configured to use the input information to search the Unified Directory 122 in the database server 120 to determine which custodians are associated with the input information. In the case of a human resources identifier being entered, only one custodian in the Unified Directory 122 may be a match. On the other hand, in the case of a name being entered, multiple custodians may be a match.

The electronic discovery management server 110, after searching the Unified Directory 122 with the input identifying information, is configured to present through the user interface 118 a list of all custodians matching the input identifying information. In the event only one match was returned for a particular set of input identifying information, the electronic discovery management server 110 is configured to automatically select the custodian to be added to the case or matter. On the other hand, in the event more than one match was located for a particular set of input identifying information, then the multiple matches may be presented together to the e-discovery manager through the user interface 118 and marked so that the e-discovery manager must review the multiple custodian profiles associated with the matches to determine the correct custodian that should be added to the case or matter. In doing so, the e-discovery manager may consider the other information in the profiles, such as corporate title, work location, associated custodians, etc. Such information can inform the e-discovery manager as to whether the located custodian is the one intended. The e-discovery manager may then select the correct custodian for addition to the case or matter and confirm that all custodians selected may be added to the case or matter. According to some embodiments, "adding" a custodian to a case or matter involves linking correlating the custodian profile in the Unified Directory 122 to the case or matter in the Case database 124.

According to some embodiments, upon adding custodians to a matter, the electronic discovery management server 110 is configured to initiate the transmission of preservation notices and surveys to the custodians. In this regard, preservation notices and surveys relevant to the particular case or matter are stored in or linked to the case profile in the case database 124. Transmission of the preservation notices and surveys to custodians added to the case may be automated, for example, there may be preset instructions within the case profile that cause the electronic discovery management server 110 to transmit a particular preservation notice and survey at a particular date or time or upon a particular initiating event, such as a custodian being added to the case, or the e-discovery manager may manually cause the preservation notices and surveys to be transmitted. In some embodiments, the electronic discovery management server 110 is configured to transmit the preservation notices and surveys via a standard email function. The surveys may be tied to the preservation notices such that they are transmitted to custodians together, and one survey may be tied to more than one preservation notice. When a custodian responds to a survey, the survey response is received by the electronic discovery management server 110 and stored in relation to the relevant custodian in the case profile in the case database 124. Furthermore, the electronic discovery management server 110 may be configured to store all or a portion of the data received in the survey response in the Unified Directory 122 in the custodian's profile.

According to some embodiments, each transmission of a preservation notice and survey to a custodian, and each corresponding response, is tracked in the relevant case profile in the case database 124. The electronic discovery management server 110 may also be configured to transmit reminder notices if responses to the surveys are not received within a predefined period of time. The electronic discovery management server 110 may also be configured to schedule reminder notices to be sent to custodians to periodically refresh the custodians' memory of their duty to preserve files/documents pertaining to the matter. In some embodiments, once a preservation notice has been sent to a custodian, the electronic discovery management server 110 may undertake to prevent any reimaging or refreshing of the custodian's personal computer(s) by transmitting an alert of the preservation notice to the enterprise's information technology management group. In addition, the survey responses received from custodians serve to inform the collection process. For example, one survey may inquire as to what network storage devices the custodian uses when storing data. The answer that the custodian gives to the survey may inform the addition of Shared Drives to the custodian profile in the Unified Database 122 that may be used later in collection.

According to some embodiments of the present invention, the e-discovery manager may utilize the user interface 118 to add attachments, notes, tasks, and search terms to a case or matter. In some embodiments, the contacts/managers for a case may also access the case profile in the case database 124 using a web browser and may add attachments, notes, tasks, and search terms to be stored therein. Thus, the e-discovery manager may not be the only entry with access to the case and case management applications of the electronic discovery management server 110. The subject matter of the attachments, notes and tasks could be anything relevant to the case or matter. In some embodiments, the tasks are tasks that particular custodians must complete and the electronic discovery management server 110 is configured to transmit a notice to the custodians that that the task needs to be completed, perhaps using standard email functions. With regard to attachments, the e-discovery manager, or the contact/manager of the case, may upload relevant files to be attached to the case profile.

With regard to the search terms, the e-discovery manager or the case contacts or managers may add certain terms to the case profile to be applied when searching the collected data to locate data responsive or relevant to the underlying issues in the case. Storing the search terms within the case profile is advantageous as it creates a record of the searching that is to be undertaken with respect to the data and aids in organization of the data, as discussed further below.

According to some embodiments of the present invention, when a decision is made that it is time to collect from certain custodians in a matter, the e-discovery manager may use the user interface 118 to release the custodians from the matter to the underlying case. This release triggers the commencement of collection of the custodians' data. In some embodiments, the electronic discovery management server 110 is configured to allow all custodians assigned to the matter to be released to the case at the same time. In addition, in instances where the e-discovery manager has previously created groups of custodians within the case, the electronic discovery management server 110 is configured to allow a group of custodians to be released from a matter to a case at the same time.

Data

Once a custodian has been identified for collection, whether manually by the e-discovery manager or by being released from a matter to a case, the electronic discovery system 100 is configured to automatically collect the custodian's data using the location information stored in the Unified Directory 122. Therefore, the electronic discovery management server 110 accesses the custodian profile of the custodian to be collected in the Unified Directory 122 and determines, from the information stored therein, the different locations of data storage for the particular custodian that must be collected. There are many different locations that the system 100 can address, including personal computers, email accounts, and network storage areas, including HomeSpaces and Shared Drives.

If a custodian profile (for a custodian released for collection) includes at least one personal computer(s) associated with the custodian, then the electronic discovery management server 110 may undertake to collect the files on these machines. Therefore, the electronic discovery management server 110 may retrieve the relevant machine identifying information, such as domain, name, IP address, etc., and may initialize deployment of a local collection application 132 running on collections server 130 (as shown in FIG. 7).

The local collection application 132 is configured to be deployed from the collections server 130 or another server within the network 102 to any of the enterprise personal computers 140. Therefore, for a particular custodian, the local collection application 132 is configured to utilize the machine identifying information supplied by the electronic discovery management server 110 to be deployed to the identified custodian computer. According to one embodiment, the local collection application 132 is configured to be automatically installed on the target custodian's personal computer. The local collection application 132 is further configured to generate a snapshot of the data residing on the local storage of the personal computer 140, for example, by using a commercially available application such as the Volume Shadow Copy Service, store the snapshot in a storage area on the personal computer, and transmit copies of the files included in the snapshot to the collections server 130. By transmitting the data from the snapshot of the data stored on the hard drive of the personal computer, the local collection application 132 advantageously allows the custodian to continue to use her machine without substantial interference from the local collection application 132 and even interact with the data stored on the hard drive as the snapshot of the data is being transmitted to the collections server 130.

In addition to the functions described above, the local collection application 132 may also be configured to transmit to the database server 120 a catalog of the files included in the snapshot to be stored in the ongoing collections database. This catalog may be referenced by the collections server 130 in order to determine whether collection is complete and to resume interrupted collections at the point of interruption. Additionally, in accordance with some embodiments, the local collection application 132 is configured to compile and transmit to the electronic discovery management server 110 a list of network resources the user is using, including, for example, network applications and file servers that the user has used or accessed. This list of resources may be stored in the database server 120 in the custodian's profile in the Unified Directory 122. With regard to transmission of the files themselves, according to one embodiment of the invention, the local collection application 132 is configured to compress, hash, and upload the files included in the snapshot to the collections server 130.

In some embodiments, the electronic discovery management server 110 may utilize a computer monitoring application 117 to determine when to attempt a collection from a custodian's machine. The computer monitoring application 117 is configured to monitor the network 102 and determine which of the enterprise personal computers 140 are online. Therefore, in the event there is a custodian whose local machine needs to be collected, the computer monitoring application 117 is configured to determine when that machine joins the network 102 (i.e., when it appears to the computer monitoring application 117) and inform the electronic discovery management server 110 that it should initialize the local collection application 132 immediately.

If a custodian profile (for a custodian released for collection) includes any paths for HomeSpaces or Shared Drives, then the electronic discovery management server 110 may undertake to collect the files from these file servers by initializing the file server collection application 134 running on collection server 130 (as shown in FIG. 7). The file server collection application 134 is configured to access the file server located at the given path, whether the file server is a HomeSpace or a Shared Drive, copy the data residing on the file server, and compress, hash, and transmit the copied data to the collections server 130. The file server collection application 134 may be programmed with preset instructions that allow it to only copy files meeting certain criteria, for example, files that have certain file extensions. Alternatively, the programmed instructions may prevent the file server collection application 134 from copying files having certain file extensions or other attributes. Either of the foregoing is advantageous if the e-discovery manager is not interested in copying executable files or source code, for example. In some embodiments, the file server collection application 134 is also configured to generate a size estimate of the files residing on the targeted file server. In one embodiment, the file server collection application 134 may automatically begin the collection process (copying and transmitting data) if the size estimate falls below a predetermined threshold. In addition, in some embodiments, the file server collection application 134 is configured to determine whether a particular folder that it is collecting from a file server includes more than a token amount of nearline files, and, in the event that the folder does include such nearline files, choose to not collect such files so as to avoid overloading the server. Therefore, according to different embodiments, the file server collection application 134 copies all or a portion of the files residing on a file server located at the path given in the released custodian's profile and transmits them to the collections server 130.

If a custodian profile (for a custodian released for collection) includes an email address for an email account on the enterprise email server 160, then the electronic discovery management server 110 may undertake to collect the files from the enterprise email server 160 by initializing the active email collection application 136 running on collections server 130 (as shown in FIG. 7). In some embodiments, the active email collection application 136 is configured to access the particular Microsoft Exchange server within the enterprise email server 160 on which the custodian's account resides (which is known based on the information included in the Unified Directory 122), copy all email located there, including emails deleted by the custodian up to a predetermined period of time prior to the collection, (for example, seven days prior to the collection) and transmit the copied emails to the collections server 130.

Regardless of the storage resource location from which data is being collected, or the particular type of data being collected, the collections server 130 is configured to store the data first (while the collection is still ongoing) in the short-term staging drive 180 until the particular collection is complete, attach a barcode to the set of data resulting from the particular collection, and then copy the data set to the long-term storage area network 190 for permanent storage. Furthermore, the collections server 130 transmits the barcode information to the electronic discovery management server 110 to be stored in the database server 120, for example, in the custodian's profile in the Unified Database 122, in relation to the stored information about the particular collection, whether it was a local collection, an active email collection, a file server collection, etc. Therefore, the barcode can be used for reference at a later date to determine the origin of the data. After the data has been copied to the long-term storage area network 190, the collections server 130 compares the hashing of the data in permanent storage to the original data in the staging drive 180 and, if the hashing is identical, purges the data from the staging drive 180.

Once the data has entered the long-term storage area network 190, it is not necessarily ready for review. Indeed, it is likely that the data may need to be processed before it is searchable and suitable for review by investigators and attorneys. For example, the files may be encrypted in the form in which they are collected and sent to the long-term storage area network 190. Therefore, according to some embodiments, the data may be copied to the conversion services server 170 where a series of decryption and standardization functions may be applied to it. After the data is decrypted and standardized, it is returned to the long-term storage area network 190 and may remain there to be accessed for review purposes.

With reference now to FIG. 8, a block diagram is provided that illustrates the electronic discovery management structure of the present invention, according to some embodiments. As illustrated in FIG. 8, certain processes described herein may be categorized within one of case management, as represented by Block 200, custodian management, as represented by Block 220, or data management, as represented by Block

240. As described above, the electronic discovery system 100 is arranged such that cases, custodians and data may be managed independent of one another. However, there is still an element of the categorization of processes within the categories that is conceptual, and it should be understood that certain processes may be correctly assigned to more than one category. Therefore, while the architecture of the system 100 allows separate management of custodians, cases, and data, certain processes of the present invention may affect more than one of the foregoing.

The first process that falls within the case management category is creation of a matter or case as a framework for litigation support activities, as shown in Block 202. As described above, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager) etc.

It is noted that custodian information is stored separately from the case information allowing for the same custodian in multiple cases. This provides for the electronic discovery system of the present invention to have scalability, whereby evidence associated with one custodian may be used in multiple cases.

The electronic discovery management server 110 stores this information in the case database 124 in the database server 120. The case database 124 houses this information such that all information relating to a particular matter or case is related within the case database 124 and a user, such as a manager or contact, can use the user interface 118 to view and edit a profile of the matter or case.

The next process within case management is the creation of preservation notices and surveys specific to the matter, as shown in Block 204. In this regard, the e-discovery manager may, through the user interface 118, either generate a new preservation notices or surveys relevant to the particular case or matter to be stored in the case profile in the case database 124 or, alternatively, link a preservation notice or survey already stored in the database server 120 to the case profile of the specific case or matter at issue. Also within case management is the creation of search terms pertinent to the case, as represented by Block 206. As described above, the e-discovery manager or a contact or manager for the case may use the user interface 118 to input individual search terms or search term sets to be applied to the data harvested in the case. In some embodiments, the search terms may be limited to be used with particular custodians and/or with particular harvested data types. The search terms will be saved in the case database 124 so that they may be readily applied to harvested data and used in connection with storing the resulting responsive data.

The processes of entering relevant attachments, notes and updates to a particular case or matter also falls within the case management category, as demonstrated by Blocks 208 and 210. The e-discovery manager or a case contact or manager may use the user interface 118 to upload documents and enter notes and other relevant data, including updates and reminders, to be stored in the case profile of the case in the case database 124. Once these attachments, notes and updates are added, they may be referenced whenever a user views the case profile through the user interface 118. The cost estimation modules of the present invention are also processes that are categorized as case management processes, as shown in Block 212. In this regard, the electronic discovery management server 110 utilizes a cost estimation application to determine the cost of harvesting and reviewing data, based on a number of factors including, for example, number of custodians, amount of harvested data, data types, etc. Finally, case management also includes a number of tasking and workflow processes that are represented by block 214.

Moving now to custodian management, certain processes falling within the category of custodian management are shown in Block 220. While the processes involving generation of the Unified Directory 122 certainly could be categorized as custodian management, the processes shown in FIG. 8 include those processes involving management of custodians within the scope of a case or matter. In that regard, the first process of custodian management included in FIG. 8 is the addition of custodians to a case or matter, as shown in Block 222. As described above, the e-discovery manager may use the user interface 118 to link a custodian's profile from the Unified Directory 122 to the particular case profile in the case database 124. Thus, the custodian profile and case profile are correlated. The next processes within custodian management is the transmission of preservation notices and surveys to custodians, as shown in Block 224, and the presentation of the surveys to custodians, as shown in Block 226. The electronic discovery management server 110 uses the contact information in the custodian's profile in the Unified Directory 122 to transmit the preservation notice(s) and survey(s) stored in the case profile to the custodian. In some embodiments, a standard email function is used, so that the only information needed from the Unified Directory 122 is the custodian's email address. When the custodian checks her email, the survey will appear as a message therein, and when she opens that message, the survey will be presented to her. The survey may be configured such that when she fills it out, the survey is automatically transmitted back to the database server 120 for storage in the case profile and the custodian's profile.

Also falling within custodian management is the process of releasing custodians from a matter to a case, as shown in Block 228. The e-discovery manager uses the user interface 118 to mark the custodian's profile so that the custodian is now activated for collection of data. This may occur within the case database 124 since the custodian's profile is linked thereto. Once the custodian is released/marked, the electronic discovery management server 110 may access the custodian's profile and initialize collection based on the various data storage locations identified in the profile. Therefore, as represented by Block 230, the electronic discovery management server 110 may automatically determine the data types and locations of data to be harvested by accessing the custodian's profile in the Unified Directory 122. Alternatively, the e-discovery manager may manually make the same determination by accessing and viewing the custodian's profile. Finally, as with case management, custodian management also includes a number of tasking and workflow processes that are represented by Block 232.

The last category is data management, represented by Block 240. One major set of processes within data management are the processes relating to the harvesting of data, as shown in Block 242. These processes include the collection of data from all the different storage areas of a particular custodian, including the custodian's local storage on her personal computer(s), the custodian's network storage areas, the custodian's email, and any other areas, as are described herein. All of the data in the various storage areas is copied and transmitted to the collections server 130, as described in detail for each particular collection application or process. Upon reaching the collections server 130, data resulting from a particular collection is temporarily stored in the short-term staging drive 180 until the collection is complete, at which point it is stored in the long-term storage area network 190 in association with a specific identifying barcode. The foregoing process is represented by Block 244. The data may require decryption or standardization functions to be applied to it in order for it to be searchable and/or otherwise usable, so the next process that falls within data management is the copying of the data to the conversion services server 170 for analysis and conversion as necessary, as shown in Block 246. Once the data is converted, it is returned to the long-term storage area network 190 to be used in review.

Also falling within data management is the association of particular data sets with particular sets of search terms stored in the case profile of the case database 124. In this regard, certain search terms stored in the case profile are stored with the intention of being applied to certain types of data and/or certain custodian's data. Alternatively, certain search terms may be applied to all data collected for a specific case. In either instance, the electronic discovery management server 110 accesses the case profile, determines the search terms to be applied, and associates the search terms with the barcode of the appropriate data sets in long-term storage. Thus, the search terms will be applied to that data and the results will be generated and presented to reviewers for analysis. Finally, as with the other management categories, data management also includes a number of tasking and workflow processes that are represented by Block 250.

With reference to FIG. 9, an exemplary process for managing a case is provided, in accordance with one embodiment of the present invention. As represented by Block 302, a case or matter is created by the e-discovery manager and stored in the case database 124. Next, custodians are added to the case, as shown in Block 304, by linking the custodian profiles of the Unified Directory 122 to the case profile. Next, as represented by Block 306, the e-discovery manager and/or the case contact or manager adds search terms to be applied to data harvested for the case, including instructions as to applying the search terms to particular data types or custodians. Block 310 represents the determination that must be made as to whether there is a matter or just a case. If there is no matter because preservation notices are not required, for example, for an audit, then the process will move straight to the initialization of data collection. On the other hand, if there is matter, rather than just a case, then the creation of preservation notices is required, as shown in Block 312.

The preservation notice, as shown in Block 314 is transmitted to the custodians added to the matter, perhaps using email. As shown in Block 316, a reminder notice module may be employed. As shown in Block 318, the reminder notice module transmits periodic reminder notices to custodians. The notices may be sent over email and may remind custodians about the preservation notice and/or remind custodians to fill out surveys. With regard to surveys, in the event a survey is required or desired, according to Block 320, a survey is created. The survey may be saved in the case profile in the case database 124. As shown in Block 322, it is possible to enable the survey to be attached to and transmitted with the preservation notices.

Next, as shown in Block 324, the e-discovery manager may release custodians from the matter to the case, which initialized collection of the custodian's data. As shown in Block 326, the e-discovery manager or the electronic discovery management server 122 accesses the custodian profile, determines the data types and location to be collected, and initializes the applicable collection applications to go collect the data. Once the data has been collected and a unique barcode has been assigned to each dataset based on the particular custodian and storage location from which it originated, as shown in Block 328, the search terms previously stored in the case profile may be assigned to the dataset based on the input instructions regarding the search terms. These search terms may be applied to the dataset and the results saved to be presented to reviewers for analysis.

With reference to FIG. 10, an exemplary process for managing a custodian is provided, in accordance with one embodiment of the present invention. First, as represented by Block 402, a custodian is added to a matter or case. In this regard, the custodian's profile in the Unified Directory 122 is linked to the relevant case or matter profile. In order to locate the custodian's profile, a custodian search module may be employed, as shown in Block 404. Therefore, the e-discovery manager may enter any identifying information about the custodian, whether it is the custodian's name, network user identification, email address, etc. The custodian search module will take the input information and search the Unified Directory 122 for a match. If more than one match is obtained, the user interface 118 will present all matches and allow the e-discovery manager to browse the associated profiles to determine the intended custodian. In this way, the correct custodian is identified and the profile of that custodian is linked to the appropriate case or matter.

As represented by Block 406, the electronic discovery management server 110 may determine whether the particular custodian added is a member of the enterprise "do-not-call list." In this regard, there may be an indication in the custodian's profile in the Unified Directory 122 that the particular custodian should not be contacted regarding collections, and an alternative contact should be used, such as an administrative assistant of the custodian. Alternatively, there may be a separate do-not-call list stored in the database server 120 that must be accessed and searched to determine whether or not the custodian appears on that list. In either instance, a determination is made as to whether or not the custodian should be directly contacted, and in the event the custodian should not be directly contacted, the contact information for the custodian's assistant (or other stand-in) should be obtained. This information will be used later for transmitting preservation notices and surveys.

Next, in accordance with Block 408, a determination is made by the electronic discovery management server 110 as to whether the custodian has been added to a matter or a case. If it is a case, then the custodian is verified, as shown in Block 424, supplemental data may be added to the custodian profile in the Unified Directory 122 as required, as shown in Block 426, and then the various collection applications are initialized by the electronic discovery management server 110 for collection of the custodian's data, as shown in Block 428. On the other hand, if it is a matter, then preservation notices are required. Therefore, as shown in Block 410, a preservation notice is sent via email to the custodian or custodian stand-in. As shown in Block 412, the custodian may then be inactivated from the case because, for some reason, data does not need to be collected from the custodian. In the future, when it comes time to collect from the custodian, the custodian will be reactivated, as shown in Block 422.

After a preservation notice is sent, a determination is made by the electronic discovery management server 110 as to whether a survey is required, as shown in Block 414. It should be noted that in alternate embodiments the decision on whether to send a survey may be made prior to sending the preservation notice. In such alternate embodiments, if the survey is required, it may become a component of the preservation notice and, thus, accessed simultaneously by the custodian. If a survey is required, it is transmitted in conjunction with a preservation notice, and the answers are collected by the electronic discovery management server 110 and stored in the database server 120, as shown in Block 416. Reminder notices for the preservation notices and surveys may also be transmitted to the custodian, as shown in Block 420. Next, once it is time to collect data, the custodian is released from the matter to the case, as shown in Block 418, and the various collection applications are initialized by the electronic discovery management server 110 for collection of the custodian's data, as shown in Block 428. In this process, the custodian's profile in the Unified Directory 122 is accessed in order to determine the various locations where the custodian may have stored data. Finally, as shown in Block 430, the custodian's data is collected.

Referring to FIGS. 11 and 12, flow diagrams are presented of a method 500 for harvest data from various data sources, in accordance with embodiments of the present invention. At Event 502, the collection of data ensues and, at Event 504, the type of data is identified. Data Block 506 signifies active email that is collected from an exchange system or the like. At Event 508 the automated active email collection application is implemented to collect email from identified email address. As previously noted, and in accordance with present embodiments of the invention, if a custodian profile (for a custodian released for collection) includes an email address for an email account on the enterprise email server (160), then the electronic discovery management server (110) may undertake to collect the files from the enterprise email server (160) by initializing the active email collection application (136) running on collections server (130). In some embodiments, the active email collection application (136) is configured to access the particular Microsoft Exchange server within the enterprise email server 160 on which the custodian's account resides (which is known based on the information included in the Unified Directory 122), copy all email located there, including emails deleted up to a designated prior period, for example, seven days prior to the collection, and transmit the copied emails to the collections server (130). The email collection application is also capable of implementing bulk requests and for collecting email on a scheduled basis, such as daily. The email collection application is additionally capable of being implementing enterprise-wide and requires no server identifiers or the like to collect the active email. In this regard, the email collection application (136) serves to reduce security risk.

At Event 510, a barcoding application is implemented at a staging location, such as short-term staging drive (180) to attach a barcode to the set of email resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180). As such, barcoding is performed without the need to execute the barcoding application on an exchange server and, as such no human intervention is needed in the barcode process. In accordance with embodiments of the present invention, one barcode may be assigned per custodian, per data type and per event (i.e., case, matter, etc.)

At Event 512, the collected email data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 514, the collected and barcoded active email data is copied to a processing drive for subsequent analysis. It should be noted that the nature of email data obviates the need to perform conversion and/or decryption on the data set. At Event 516, the active email data set is loaded into the analysis application and, at Event 518, the data set is exported to the requestor/reviewer for analysis.

Data Block 520 signifies other non-exchange server based email, such as email accessed through a client-server, collaborative application, such as Lotus Notes® or the like. At Event 522, NSF files or any other file types associated with non-exchange server based email is manually harvested from an enterprise-grade email server having collaborative capabilities, such as a Lotus Domino server or the like.

At Event 522, a barcoding application is implemented at a staging location, such as short-term staging drive (180) to attach a barcode to the set of non-exchange server email resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180).

At Event 526, the collected non-exchange server email data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 528, the NSF files or any other file types associated with non-exchange server based email that may be encrypted is decrypted using a decryption application, in accordance with embodiments of the present invention. The encryption of NSF files occurs at the user level and, therefore only the user has the password necessary for decryption. The decryption application allows for decryption of the NSF filetype data without the knowledge of the user/encrypter. The decryption application finds ID files that exist anywhere in the enterprise system, creates a database of the ID files, associates the database with the user/encrypter and subsequently decrypts the data.

At Event 530, the non-exchange server email data set is loaded into the analysis application and, at Event 532, the data set is exported to the requestor/reviewer for analysis.

Data Block 534 signifies journaled data, such as electronic commerce data stored on a repository for the purpose of regulation, compliance to regulating bodies, such as the Securities and Exchange Commission (SEC) or the like. At Event 536, criteria is extracted from input system and manually entered in a designated third party system for data retrieval.

At Event 538, the barcoding application is implemented at a staging location, such as short-term staging drive (180) to attach a barcode to the set of journaled data resulting from the particular collection. The barcoded data is then copied and communicated to the long-term storage area network (190) for permanent storage. At Event 540, the collected and barcoded journaled data may be associated with a specific search term set or sets.

At Event 542 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing file conversions may be required on EML formatted files, MSG formatted files and the like.

At Event 544, the journaled data set is loaded into the analysis application and, at Event 546, the journaled data set is exported to the requestor/reviewer for analysis.

Referring to FIG. 12, data block 548 signifies data from a local Personal Computer (PC), such as enterprise PC (140). At Event 550, the local collection application (132) is implemented to collect data from designated PCs by taking a "snapshot" of the device's hard drive. According to one embodiment of the invention, the local collection application may be autodeployed thus, obviating the need for any manual entry by the e-discovery manager or the like. In other embodiments of the invention, the local collection application (132) may be employed to collect data from network storage.

At Event 552, the barcoding application is implemented at a staging location, such as short-term staging drive (180) to attach a barcode to the set of local PC data resulting from the particular collection. The barcoded data is then copied and communicated to the long-term storage area network (190) for permanent storage. At Event 554, the collected and barcoded local PC data may be associated with a specific search term set or sets.

At Event 556 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing file conversions may be required on EML formatted files, MSG formatted files, IPD formatted files and the like.

At Event 558, the local PC files that may be encrypted are decrypted using a decryption application, in accordance with embodiments of the present invention. The decryption application allows for decryption of the PC files data without the knowledge of the user/encrypter. The decryption application finds ID files that exist anywhere in the enterprise system, creates a database of the ID files, associates the database with the user/encrypter and subsequently decrypts the data.

At Event 560, the local PC data set is loaded into the analysis application and, at Event 562, the local PC data set is exported to the requestor/reviewer for analysis.

Data block 564 signifies data from network storage, such as a shared drive or HomeSpace. At Event 566, the file server collection application (134) is implemented to automatically collect data from shared drives and/or HomeSpace. According to one embodiment of the invention, the file server collection application (134) may be autodeployed thus, obviating the need for any manual entry by the e-discovery manager or the like.

At Event 568, the barcoding application is implemented at a staging location, such as short-term staging drive (180) to attach a barcode to the set of network storage data resulting from the particular collection. The barcoded data is then copied and communicated to the long-term storage area network (190) for permanent storage. At Event 570, the collected and barcoded network storage data may be associated with a specific search term set or sets.

At Event 572 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing file conversions may be required on EML formatted files, MSG formatted files, IPD formatted files and the like.

At Event 574, the network storage files that may be encrypted are decrypted using a decryption application, in accordance with embodiments of the present invention. The decryption application allows for decryption of the network storage data without the knowledge of the user/encrypter. The decryption application finds ID files that exist anywhere in the enterprise system, creates a database of the ID files, associates the database with the user/encrypter and subsequently decrypts the data.

At Event 576, the network storage data set is loaded into the analysis application and, at Event 578, the network storage data set is exported to the requestor/reviewer for analysis.

Data block 580 signifies electronic data for forensics. At Event 582, a forensic collector application, such as EnCase® may be executed on the devices of interest to collect data. According to one embodiment of the invention, the forensic collector application may be automatically deployed on the device of interest without the knowledge of the device user. In accordance with another embodiment of the invention, a computer monitoring application may be implemented (not shown in FIG. 11 or 12) that monitors the network to determine the addition or subtraction of computers to the network based on network status indicators, such as ID's/IP addresses returned from the network.

At Event 584, the barcoding application is implemented at a staging location, such as short-term staging drive (180) to attach a barcode to the set of forensic data resulting from the particular collection. The barcoded data is then copied and communicated to the long-term storage area network (190) for permanent storage. At Event 586, the collected and barcoded forensic data may be associated with a specific search term set or sets.

At Event 588 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing may be required on EML formatted files, MSG formatted files, IPD formatted files and the like.

At Event 590, the forensic files that may be encrypted are decrypted using a decryption application, in accordance with embodiments of the present invention. The decryption application allows for decryption of the network storage data without the knowledge of the user/encrypter. The decryption application finds ID files that exist anywhere in the enterprise system, creates a database of the ID files, associates the database with the user/encrypter and subsequently decrypts the data.

At Event 592, the forensic data set is loaded into the analysis application and, at Event 594, the network storage data set is exported to the requestor/reviewer for analysis.

Data block 596 signifies collaborative data, such as data residing at discovery sites, for example LiveLink® or the like. At Event 598, a discovery site collector application, such as a LiveLink® collector application may be executed on the devices of interest to collect data. According to one embodiment of the invention, the discovery site collector preserves at least a portion of the discovery site database in the e-discovery database, including all files and all revisions of the files. In this regard, the discovery site collector application queries against the database to define what files need to be retrieved, then copies those files based on the result of the query. Metadata pertaining to the files is retained in the case management system tables. In accordance with another embodiment of the invention, the discovery site collector application collects the documents and the related metadata and uses the metadata to automatically rename the files.

At Event 600, the barcoding application is implemented at a staging location, such as short-term staging drive (180) to attach a barcode to the set of discovery site data resulting from the particular collection. The barcoded data is then copied and communicated to the long-term storage area network (190) for permanent storage. At Event 602, the collected and barcoded discovery site data may be associated with a specific search term set or sets.

At Event 604 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source-to-processing may be required on EML formatted files, MSG formatted files, IPD formatted files and the like.

At Event 606, the discovery site data set is loaded into the analysis application and, at Event 608, the discovery site data set is exported to the requestor/reviewer for analysis.

Thus, present embodiments herein disclosed provide for improvements in electronic discovery. Embodiments herein disclosed provide for an enterprise-wide e-discovery system that provides for data to be identified, located, retrieved, preserved, searched, reviewed and produced in an efficient and cost-effective manner across the entire enterprise system. In addition, by structuring management of e-discovery based on case/matter, custodian and data and providing for linkage between the same, further efficiencies are realized in terms of identifying, locating and retrieving data and leveraging results of previous e-discoveries with current requests.

Specifically, embodiments of the invention previously disclosed provide for positive identification of individuals requiring addition, as custodians, to cases or matters within an electronic discovery system. The identification is performed simultaneously, in bulk, using disparate information related to the individuals. In this regard, individuals can be positively identified through one specific identification procedure, without having to search multiple databases to verify the identity of an individual/custodian. In addition to positively identifying custodians, the present invention provides for adding the identified custodians, simultaneously, in bulk, to a case or matter and, in some embodiments, uploading or otherwise transferring custodian profile data to the case management system/database, as need be. Such processing adds further efficiency to the overall e-discovery management process.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for adding, in unison, a plurality of custodians to a case within an electronic discovery system, the method comprising:

receiving, at a computing device, a plurality of identifying data items, wherein each of the plurality of identifying data items is associated with one of a plurality of individuals that are potential custodians for a case within the electronic discovery system;

accessing, via a computing device processor, a database within the electronic discovery system, wherein the database stores data associated with custodians in the electronic discovery system;

determining, via a computing device processor, matches between the plurality of identifying data items and the data associated with the custodians;

presenting, at a computing device, for each of the determined matches, custodian profiles that include data associated with the custodian including a custodian name, job title and email address;

receiving, at a computing device, a first input configured to add, in unison, a plurality of custodians to a case based on user selection of the presented custodian profiles;

inputting, via a computing device processor, at least a portion of the data associated with the custodian into a case management system, wherein the input occurs automatically based on receipt of the first input that adds the plurality of custodians to the case; and in response to adding the plurality of custodians to the case, automatically initiating, via a computing device, collection of active email data from email accounts associated with each of the custodians, wherein the active email data is collected from an enterprise email server on which the custodian's account resides and includes collection of emails deleted by the associated custodian up to a predetermined time period prior to the collection and, upon collection is processed for electronic discovery analysis.

2. The method of claim 1, further comprising:
receiving, at a computing device, a second input configured to initiate an electronic discovery activity on the plurality of custodians added to the case; and
initiating, via a computing device processor, the electronic discovery activity on the plurality of custodians added to the case.

3. The method of claim 1, wherein receiving a second input further comprises receiving, at the computing device, the second input configured to initiate communication of one or more preservation notices to each of the plurality of custodians and wherein initiating further comprises initiating, via the computing device processor, the communication of the preservation notice to the plurality of custodians.

4. The method of claim 1, wherein receiving a second input further comprises receiving, at the computing device, the second input configured to initiate electronic collection of data from devices associated with each of the plurality of custodians and wherein initiating further comprises initiating, via the computing device processor, the electronic collection of data from devices associated with each of the plurality of custodians.

5. The method of claim 1, wherein receiving the plurality of identifying data items further comprises receiving, at the computing device, the plurality of identifying data items, wherein the identifying data items include one or more of a first name, a last name, an email address, an operating system account number or an employee number.

6. The method of claim 1, wherein receiving the plurality of identifying data items further comprises receiving, at the computing device, the plurality of identifying data items, wherein each of the identifying data items correspond to a specific data entry in the database.

7. The method of claim 1, wherein determining matches further comprises determining more than one match between one of the identifying data items and the data associated with the custodians.

8. The method of claim 7, further comprising receiving, at a computing device, a second input that selects one of the custodian profiles for inclusion in the plurality of custodians to be added to the case, wherein selection is based on the determination of more than one match between at least one of the identifying data items and the data associated with the custodians.

9. An apparatus for adding, in unison, a plurality custodians to a case within an electronic discovery system, the apparatus comprising:
a computing platform including at least one processor and a memory;
a bulk custodian entry application, stored in the memory executable by the at least one processor and including:
a first user interface configured to receive a plurality of identifying data items, wherein each of the plurality of identifying data items is associated with one of a plurality of individuals that are potential custodians for a case within the electronic discovery system,
a custodian match routine configured to access a database within the electronic discovery system, which stores data associated with custodians and determine matches between the plurality of identifying data items and the data associated with the custodians,
a second user interface configured to present, for each of the determined matches, custodian profiles that include data associated with the custodian including custodian name, job title and email address and receive a first input configured to add, in unison, a plurality of custodians to a case based on user selection of the presented custodian profiles, and
a custodian data upload routine configured to automatically upload at least a portion of the data associated with the custodian into the case management system; and
a data collection routine stored in the memory, executable by the processor and configured to automatically initiate collection of active email data from email accounts associated with each of the custodians in response to adding the plurality of custodians to the case, wherein the active email data is collected from an enterprise email server on which the custodian's account resides and includes collection of emails deleted by the associated custodian up to a predetermined time period prior to the collection and, upon collection is processed for electronic discovery analysis.

10. The apparatus of claim 9, further comprising a preservation notice application stored in the memory, executable by the processor, and configured to receive a second input operable to initiate communication of a preservation notice to each of the plurality of custodians added to the case and including a preservation notice routine configured to initiate the communication of the preservation notice to the plurality of custodians based on the second input.

11. The apparatus of claim 9, further comprising a data collection application stored in the memory, executable by the processor and configured to receive a second input operable to initiate collection of data from devices associated with each of the plurality of custodians added to the case and including a data collection routine configured to initiate collection of data from the devices associated with each of the plurality of custodians based on the second input.

12. The apparatus of claim 9, wherein the first user interface is further configured to receive the plurality of identifying data items, wherein the identifying data items include one of a first name, a last name, an email address, an operating system account number or an employee number.

13. The apparatus of claim 9, wherein the first user interface is further configured to receive the plurality of identifying data items, wherein each of the identifying data items correspond to a specific data entry in the database.

14. The apparatus of claim 9, wherein the custodian match routine is further configured to determine more than one match between one of the identifying data items and the data associated with the custodians.

15. The apparatus of claim 14, wherein the second user interface is further configured to receive a second input that selects one of the custodian profiles for inclusion in the plurality of custodians to be added to the case, wherein selection is based on the determination of more than one match between at least one of the identifying data items and the data associated with the custodians.

16. A computer program product comprising:
a non-transitory computer-readable medium comprising:
a first set of codes for causing a computer to receive a plurality of identifying data items, wherein each of the plurality of identifying data items is associated with one of a plurality of individuals that are potential custodians within an electronic discovery system;
a second set of codes for causing a computer to access a database within the electronic discovery system, wherein the database stores data associated with custodians in the electronic discovery system;
a third set of codes for causing a computer to determine matches between the plurality of identifying data items and the data associated with the custodians;

a fourth set of codes for causing a computer to present, for each of the determined matches, custodian profiles that include data associated with the custodian including a custodian name, job title and email address;

a fifth set of codes for causing a computer to receive a first input configured to add, in unison, a plurality of custodians to a case based on user selection of the presented custodian profiles;

a sixth set of codes for causing a computer to input at least a portion of the data associated with the custodian into the case management system, wherein the input occurs automatically based on receipt of the first input that adds the plurality of custodians to the case; and a seventh set of codes for causing a computer, automatically initiate, in response to adding the plurality of custodians to the case, collection of active email data from email accounts associated with each of the custodians, wherein the active email data is collected from an enterprise email server on which the custodian's account resides and includes collection of emails deleted by the associated custodian up to a predetermined time period prior to the collection and, upon collection is processed for electronic discovery analysis.

17. The computer program product of claim 16, further comprising:

an eighth set of codes for causing a computer to receive a second input configured to initiate an electronic discovery activity on the plurality of custodians added to the case; and a ninth set of codes for causing a computer to initiate the electronic discovery activity on the plurality of custodians added to the case.

18. The computer program product of claim 17, wherein the eighth set of codes is further configured to cause the computer to receive the second input configured to initiate communication of one or more preservation notices to each of the plurality of custodians and wherein the seventh set of codes is further configured to cause the computer to initiate the communication of the preservation notice to the plurality of custodians.

19. The computer program product of claim 17, wherein the eighth set of codes is further configured to cause the computer to receive the second input configured to initiate electronic collection of data from devices associated with each of the plurality of custodians and wherein the seventh set of codes is further configured to cause the computer to initiate the electronic collection of data from devices associated with each of the plurality of custodians.

20. The computer program product of claim 16, wherein the first set of codes is further configured to cause the computer to receive the plurality of identifying data items, wherein the identifying data items include one or more of a first name, a last name, an email address, an operating system account number or an employee number.

21. The computer program product of claim 16, wherein the first set of codes is further configured to cause the computer to receive the plurality of identifying data items, wherein each of the identifying data items correspond to a specific data entry in the database.

22. The computer program product of claim 16, wherein the third set of codes is further configured to cause the computer to determine more than one match between one of the identifying data items and the data associated with the custodians.

23. The computer program product of claim 22, further comprising an eighth set of codes for causing a computer to receive a second input that selects one of the custodian profiles for inclusion in the plurality of custodians to be added to the case, and wherein selection is based on the determination of more than one match between at least one of the identifying data items and the data associated with the custodians.

* * * * *